US012701118B2

(12) United States Patent
Ben-Noon et al.

(10) Patent No.: US 12,701,118 B2
(45) Date of Patent: Aug. 4, 2026

(54) USER ACTIVITY AUDITING OF RESOURCE TRAVERSAL ACROSS CONNECTED COMPANY NODES

(71) Applicant: Palo Alto Networks, Inc., Santa Clara, CA (US)

(72) Inventors: Ofer Ben-Noon, Tel Aviv (IL); Ohad Bobrov, Tel Aviv (IL); Guy Harpak, Ramat Gan (IL); Eran Rom, Tel Aviv (IL); Ido Salomon, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 7 days.

(21) Appl. No.: 18/665,647

(22) Filed: May 16, 2024

(65) Prior Publication Data

US 2025/0150512 A1    May 8, 2025

Related U.S. Application Data

(63) Continuation of application No. PCT/IL2023/050652, filed on Jun. 22, 2023.

(Continued)

(51) Int. Cl.
*H04L 9/40* (2022.01)
*G06F 21/16* (2013.01)
(Continued)

(52) U.S. Cl.
CPC .............. *H04L 63/10* (2013.01); *G06F 21/16* (2013.01); *G06F 21/554* (2013.01); *G06F 21/6245* (2013.01); *H04L 63/105* (2013.01); *H04L 63/1433* (2013.01); *H04L 63/205* (2013.01); *H04L 67/1396* (2022.05);
(Continued)

(58) Field of Classification Search
CPC ... H04L 63/10; H04L 67/1396; H04L 67/535; H04L 63/1416; H04L 63/1425; G06F 21/16; G06F 21/554
See application file for complete search history.

(56) References Cited

U.S. PATENT DOCUMENTS 9,497,205 B1 * 11/2016 Claudatos ............. H04L 63/123
10,552,639 B1    2/2020 Buzbee et al.
(Continued)

FOREIGN PATENT DOCUMENTS

WO    2018213457 A1    11/2018
WO    2025015927 A    1/2025

OTHER PUBLICATIONS

U.S. Appl. No. 18/665,654, Non-Final Office Action mailed Sep. 26, 2025, 7 pages.
(Continued)

*Primary Examiner* — David R Lazaro
(74) *Attorney, Agent, or Firm* — GILLIAM IP PLLC

(57) ABSTRACT

Based on occurrence of audit trigger events that include uploading, downloading, modifying, copying, and pasting of resources across browsers at nodes of a company, audit records are generated that indicate user identifiers, time stamps, metadata, and content associated with the resources. The audit records specify trajectories/traversals of resources across the company that are used to determine associated users and data breaches. Pairs of audit records in the traversals have same hashes of content/metadata of a corresponding resource.

23 Claims, 10 Drawing Sheets

Related U.S. Application Data

(60) Provisional application No. 63/354,896, filed on Jun. 23, 2022.

(51) Int. Cl.

| | |
|---|---|
| *G06F 21/55* | (2013.01) |
| *G06F 21/62* | (2013.01) |
| *H04L 67/1396* | (2022.01) |
| *H04L 67/50* | (2022.01) |
| *H04L 67/306* | (2022.01) |

(52) U.S. Cl.

CPC ...... *H04L 67/535* (2022.05); *G06F 2221/034* (2013.01); *G06F 2221/2141* (2013.01); *H04L 67/306* (2013.01)

(56) References Cited

U.S. PATENT DOCUMENTS

| | | | | |
|---|---|---|---|---|
| 11,010,476 | B2 | 5/2021 | Wilczynski et al. | |
| 11,290,429 | B1 | 3/2022 | Ashley et al. | |
| 11,388,167 | B2 | 7/2022 | Boodaei | |
| 11,582,316 | B1 | 2/2023 | Danyi et al. | |
| 11,949,707 | B1 | 4/2024 | Syme et al. | |
| 12,277,246 | B1 | 4/2025 | Manton et al. | |
| 12,299,119 | B2 * | 5/2025 | Ko | H04L 63/14 |
| 2008/0159146 | A1 * | 7/2008 | Claudatos | H04L 63/0421 370/235 |
| 2008/0162135 | A1 * | 7/2008 | Claudatos | H04M 3/2281 704/243 |
| 2013/0227714 | A1 * | 8/2013 | Gula | H04L 63/1408 726/32 |
| 2014/0129920 | A1 | 5/2014 | Sheretov et al. | |
| 2015/0047034 | A1 * | 2/2015 | Burnham | H04L 63/1441 726/23 |
| 2015/0149558 | A1 | 5/2015 | Mendez et al. | |
| 2016/0019002 | A1 | 1/2016 | Kurtin et al. | |
| 2016/0080397 | A1 * | 3/2016 | Bacastow | H04L 63/1408 726/1 |
| 2016/0286410 | A1 | 9/2016 | O'Malley | |
| 2017/0186019 | A1 | 6/2017 | Loeb et al. | |
| 2017/0353496 | A1 | 12/2017 | Pai et al. | |
| 2018/0075058 | A1 * | 3/2018 | Boutnaru | H04L 63/04 |
| 2018/0191770 | A1 | 7/2018 | Nachenberg et al. | |
| 2018/0219849 | A1 | 8/2018 | Jones et al. | |
| 2018/0351979 | A1 * | 12/2018 | Mandrychenko | G06F 16/1734 |
| 2018/0373578 | A1 | 12/2018 | Bridges et al. | |
| 2018/0375877 | A1 | 12/2018 | Jakobsson et al. | |

| | | | | |
|---|---|---|---|---|
| 2020/0151348 | A1 | 5/2020 | Chauhan | |
| 2020/0250323 | A1 | 8/2020 | Remington et al. | |
| 2020/0265112 | A1 | 8/2020 | Fox et al. | |
| 2020/0293684 | A1 | 9/2020 | Harris et al. | |
| 2021/0026982 | A1 | 1/2021 | Amarendran et al. | |
| 2021/0194888 | A1 | 6/2021 | Bhaskar et al. | |
| 2021/0250333 | A1 | 8/2021 | Negrea et al. | |
| 2021/0409446 | A1 * | 12/2021 | Di Mattia | H04L 63/1408 |
| 2022/0067216 | A1 | 3/2022 | Bokade et al. | |
| 2022/0188438 | A1 | 6/2022 | Lewin et al. | |
| 2022/0309183 | A1 | 9/2022 | Jose et al. | |
| 2022/0358234 | A1 | 11/2022 | Shank et al. | |
| 2022/0382902 | A1 | 12/2022 | Panikkar | |
| 2023/0140559 | A1 * | 5/2023 | Bendersky | H04L 9/0822 713/164 |
| 2023/0262053 | A1 | 8/2023 | Nilgiri et al. | |
| 2023/0267219 | A1 | 8/2023 | Perumalla et al. | |
| 2024/0012941 | A1 | 1/2024 | Goradia et al. | |
| 2024/0039918 | A1 * | 2/2024 | Ben-Noon | G06F 21/604 |
| 2024/0045953 | A1 * | 2/2024 | Ben-Noon | G06F 21/604 |
| 2024/0193539 | A1 | 6/2024 | Leu et al. | |
| 2024/0378314 | A1 | 11/2024 | Chawla et al. | |
| 2025/0016167 | A1 * | 1/2025 | Ben-Noon | G06F 21/604 |
| 2025/0094593 | A1 | 3/2025 | Smith et al. | |
| 2025/0150512 | A1 * | 5/2025 | Ben-Noon | G06F 21/604 |
| 2025/0175486 | A1 * | 5/2025 | Ben-Noon | G06F 21/604 |
| 2025/0181681 | A1 * | 6/2025 | Ben-Noon | G06F 21/604 |

OTHER PUBLICATIONS

PCT Application PCT/IL2023/050652, International Preliminary Report on Patentability, mailed Jan. 2, 2025, 12 pages.

PCT Application PCT/IL2023/050652, International Search Report & Written Opinion mailed Nov. 28, 2023, 17 pages.

U.S. Appl. No. 18/487,087, Non-Final Office Action mailed May 8, 2025, 9 pages.

U.S. Appl. No. 18/487,085, Non-Final Office Action mailed Jun. 27, 2025, 14 pages.

U.S. Appl. No. 18/487,085, Notice of Allowance mailed Dec. 10, 2025, 17 pages.

U.S. Appl. No. 18/487,085, Notice of Allowance mailed Oct. 16, 2025, 11 pages.

U.S. Appl. No. 18/487,087, Final Office Action mailed Nov. 3, 2025, 9 pages.

U.S. Appl. No. 18/665,625, Notice of Allowance mailed Sep. 23, 2025, 24 pages.

U.S. Appl. No. 18/665,630, Non-Final Office Action, mailed Nov. 5, 2025, 14 pages.

\* cited by examiner

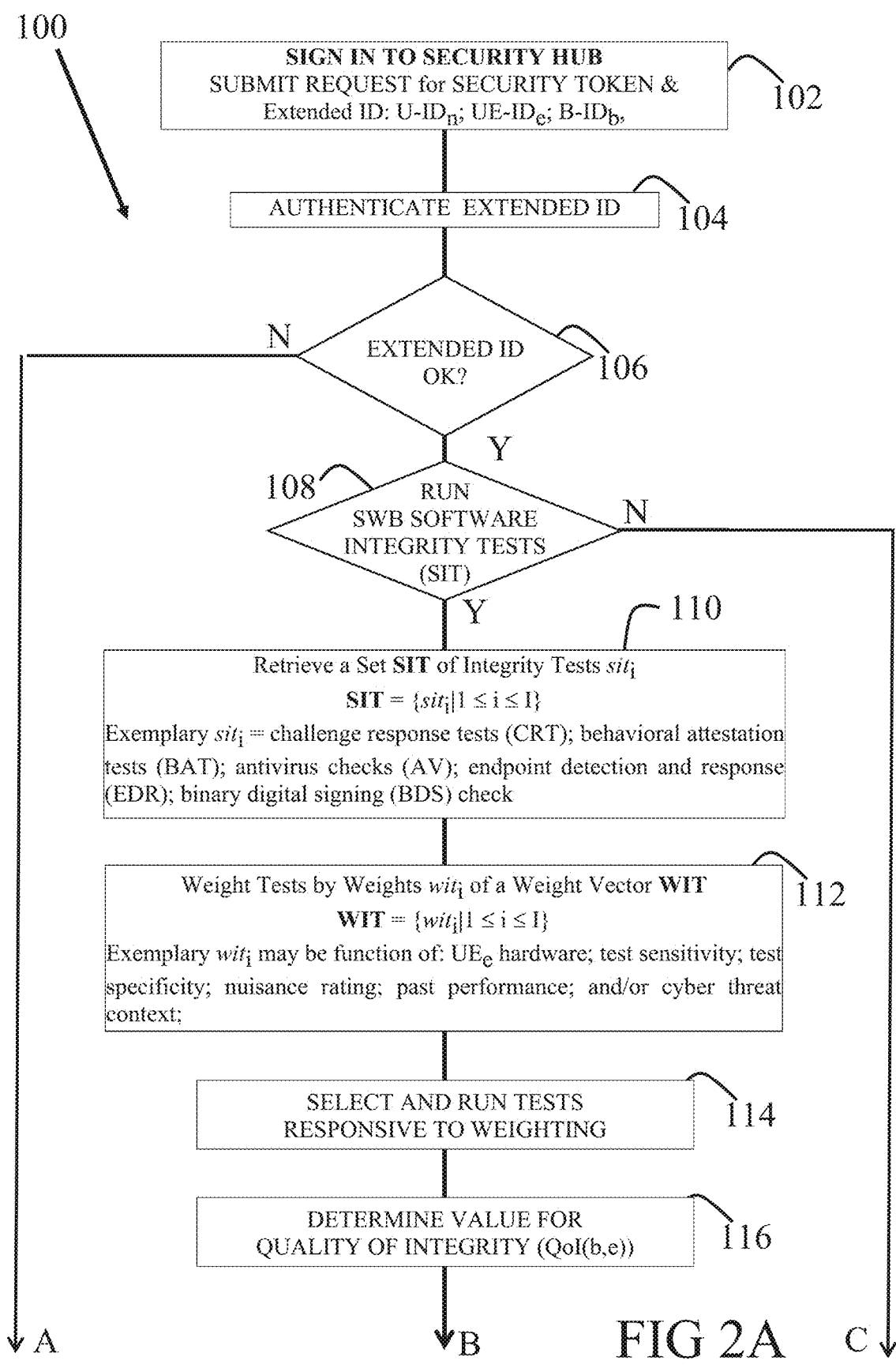

100

SIGN IN TO SECURITY HUB
SUBMIT REQUEST for SECURITY TOKEN &
Extended ID: $U\text{-}ID_n$; $UE\text{-}ID_e$; $B\text{-}ID_b$,                102

AUTHENTICATE EXTENDED ID      104

N ← EXTENDED ID OK?     106

Y

108   RUN SWB SOFTWARE INTEGRITY TESTS (SIT)   N

Y

Retrieve a Set SIT of Integrity Tests $sit_i$     110

$$\mathbf{SIT} = \{sit_i | 1 \le i \le I\}$$

Exemplary $sit_i$ = challenge response tests (CRT); behavioral attestation tests (BAT); antivirus checks (AV); endpoint detection and response (EDR); binary digital signing (BDS) check Weight Tests by Weights $wit_i$ of a Weight Vector WIT     112

$$\mathbf{WIT} = \{wit_i | 1 \le i \le I\}$$

Exemplary $wit_i$ may be function of: $UE_e$ hardware; test sensitivity; test specificity; nuisance rating; past performance; and/or cyber threat context;

SELECT AND RUN TESTS RESPONSIVE TO WEIGHTING     114

DETERMINE VALUE FOR QUALITY OF INTEGRITY (QoI(b,e))     116

A          B          FIG 2A     C

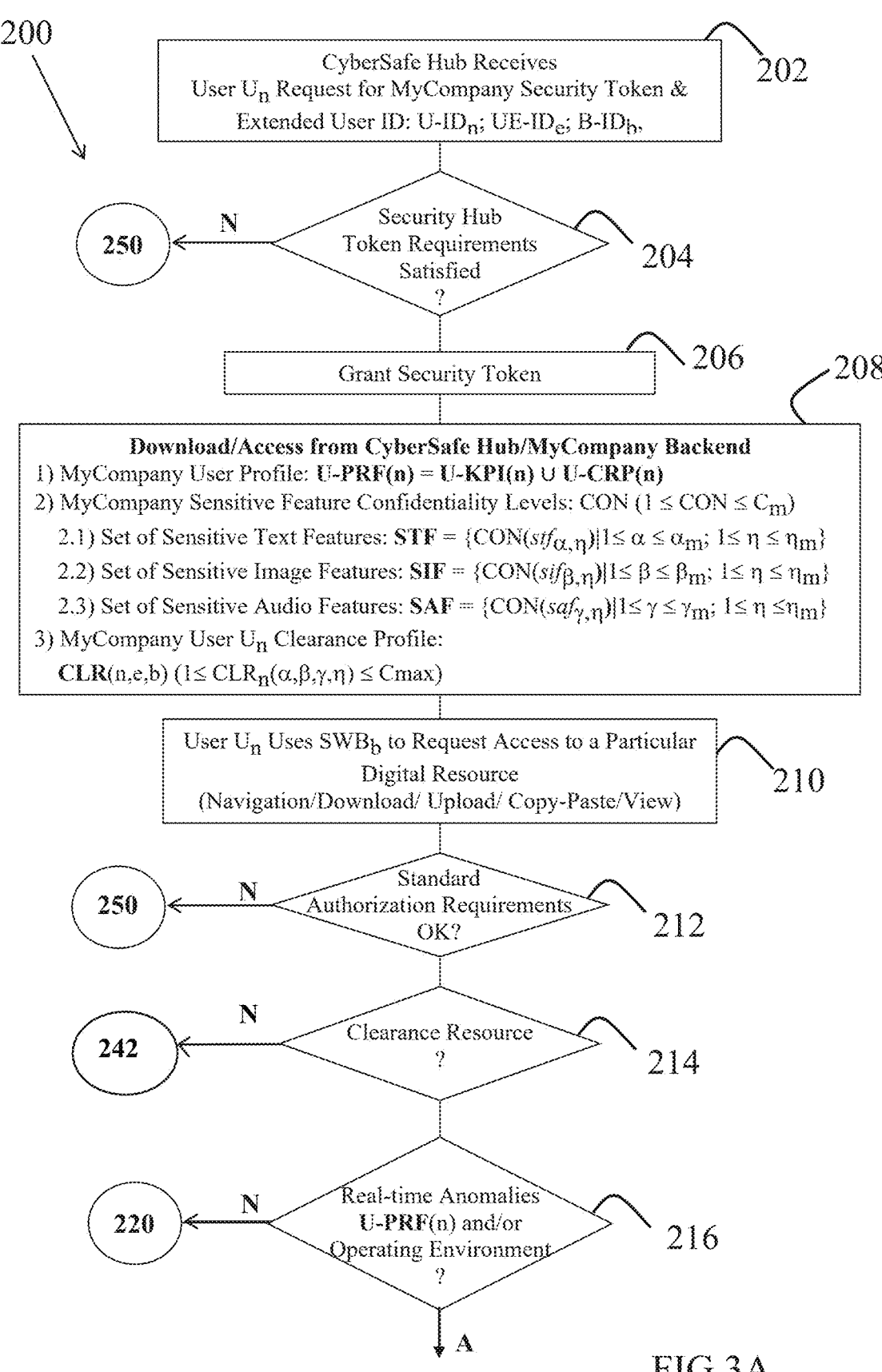

200

CyberSafe Hub Receives
User $U_n$ Request for MyCompany Security Token &
Extended User ID: $U\text{-}ID_n$; $UE\text{-}ID_e$; $B\text{-}ID_b$, — 202

Security Hub
Token Requirements
Satisfied
? — 204    N → 250

Grant Security Token — 206

208
Download/Access from CyberSafe Hub/MyCompany Backend
1) MyCompany User Profile: $U\text{-}PRF(n) = U\text{-}KPI(n) \cup U\text{-}CRP(n)$
2) MyCompany Sensitive Feature Confidentiality Levels: $CON\ (1 \leq CON \leq C_m)$
   2.1) Set of Sensitive Text Features: $STF = \{CON(stf_{\alpha,\eta})|1 \leq \alpha \leq \alpha_m;\ 1 \leq \eta \leq \eta_m\}$
   2.2) Set of Sensitive Image Features: $SIF = \{CON(sif_{\beta,\eta})|1 \leq \beta \leq \beta_m;\ 1 \leq \eta \leq \eta_m\}$
   2.3) Set of Sensitive Audio Features: $SAF = \{CON(saf_{\gamma,\eta})|1 \leq \gamma \leq \gamma_m;\ 1 \leq \eta \leq \eta_m\}$
3) MyCompany User $U_n$ Clearance Profile:
   $CLR(n,e,b)\ (1 \leq CLR_n(\alpha,\beta,\gamma,\eta) \leq Cmax)$ User $U_n$ Uses $SWB_b$ to Request Access to a Particular
Digital Resource
(Navigation/Download/ Upload/ Copy-Paste/View) — 210

Standard
Authorization Requirements
OK? — 212    N → 250

Clearance Resource
? — 214    N → 242

Real-time Anomalies
$U\text{-}PRF(n)$ and/or
Operating Environment
? — 216    N → 220

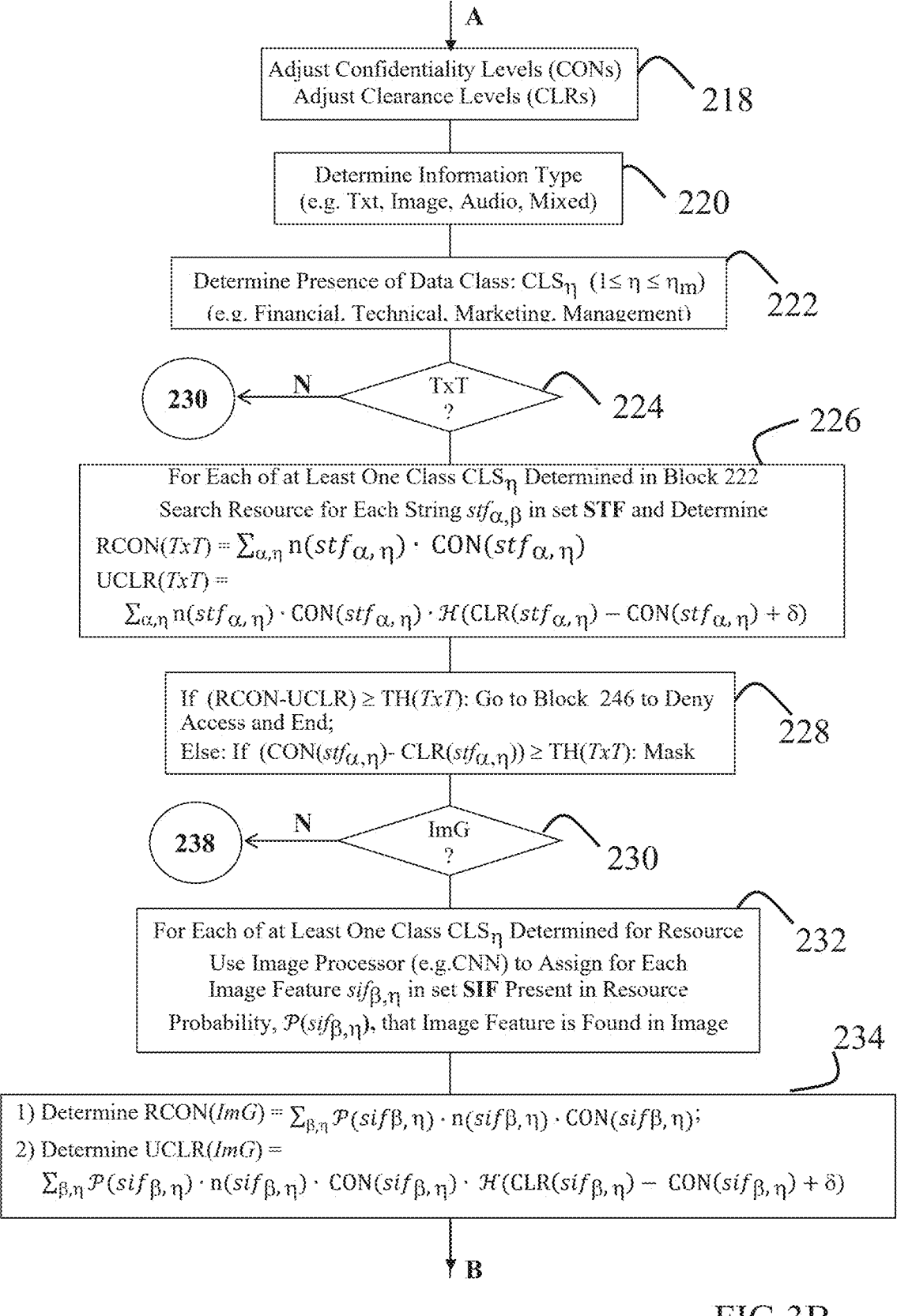

A

Adjust Confidentiality Levels (CONs)
Adjust Clearance Levels (CLRs)   218

Determine Information Type
(e.g. Txt, Image, Audio, Mixed)   220

Determine Presence of Data Class: $CLS_\eta$ $(1 \le \eta \le \eta_m)$
(e.g. Financial, Technical, Marketing, Management)   222

230 ← N — TxT ?   224

226

For Each of at Least One Class $CLS_\eta$ Determined in Block 222
Search Resource for Each String $stf_{\alpha,\beta}$ in set STF and Determine
$RCON(TxT) = \sum_{\alpha,\eta} n(stf_{\alpha,\eta}) \cdot CON(stf_{\alpha,\eta})$
$UCLR(TxT) =$
$\sum_{\alpha,\eta} n(stf_{\alpha,\eta}) \cdot CON(stf_{\alpha,\eta}) \cdot \mathcal{H}(CLR(stf_{\alpha,\eta}) - CON(stf_{\alpha,\eta}) + \delta)$ If $(RCON-UCLR) \ge TH(TxT)$: Go to Block 246 to Deny
Access and End;
Else: If $(CON(stf_{\alpha,\eta}) - CLR(stf_{\alpha,\eta})) \ge TH(TxT)$: Mask   228

238 ← N — ImG ?   230

For Each of at Least One Class $CLS_\eta$ Determined for Resource   232
Use Image Processor (e.g.CNN) to Assign for Each
Image Feature $sif_{\beta,\eta}$ in set SIF Present in Resource
Probability, $\mathcal{P}(sif_{\beta,\eta})$, that Image Feature is Found in Image

234

1) Determine $RCON(ImG) = \sum_{\beta,\eta} \mathcal{P}(sif_{\beta,\eta}) \cdot n(sif_{\beta,\eta}) \cdot CON(sif_{\beta,\eta})$;
2) Determine $UCLR(ImG) =$
$\sum_{\beta,\eta} \mathcal{P}(sif_{\beta,\eta}) \cdot n(sif_{\beta,\eta}) \cdot CON(sif_{\beta,\eta}) \cdot \mathcal{H}(CLR(sif_{\beta,\eta}) - CON(sif_{\beta,\eta}) + \delta)$

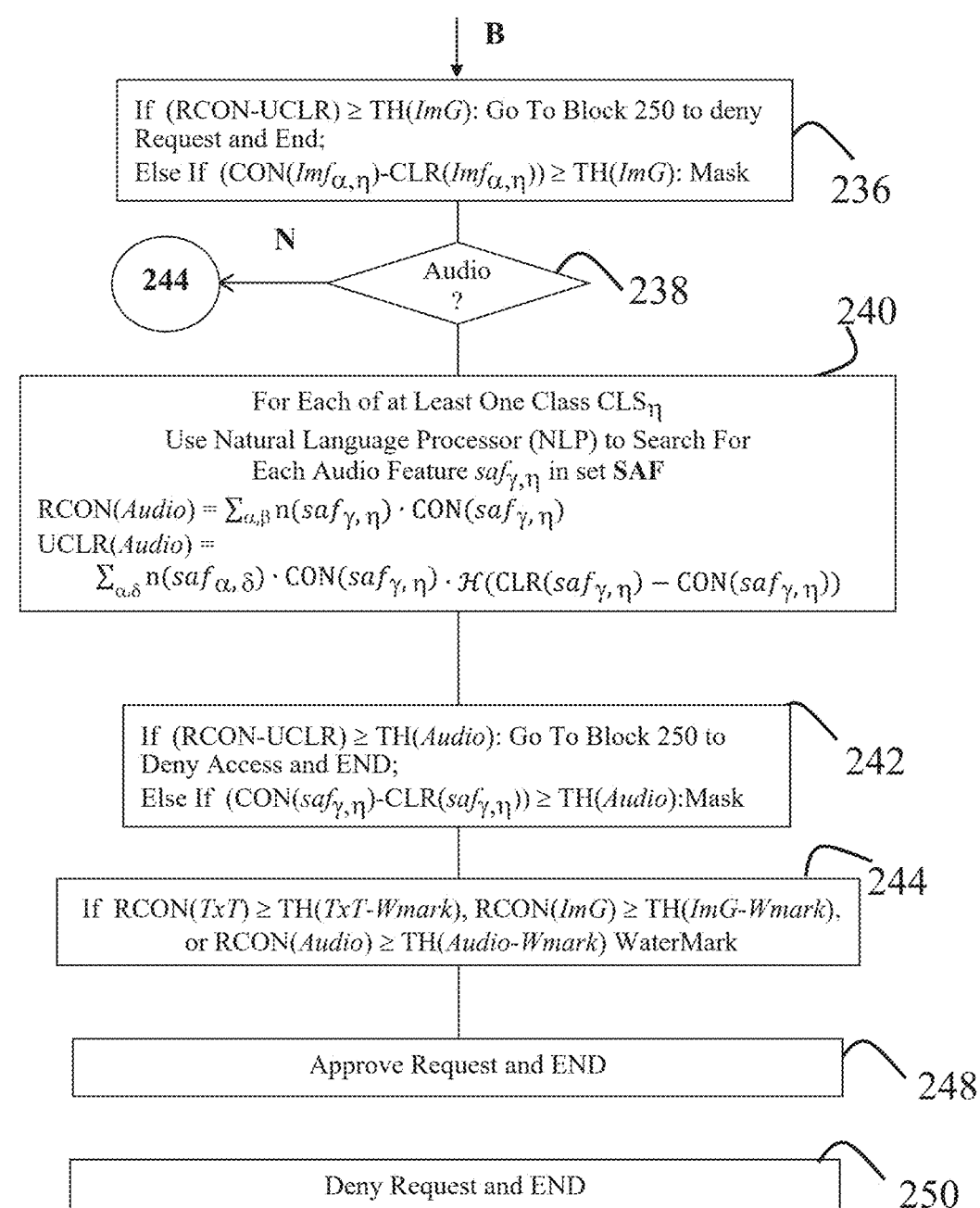

B

If (RCON-UCLR) $\geq$ TH($ImG$): Go To Block 250 to deny Request and End;
Else If (CON($Imf_{\alpha,\eta}$)-CLR($Imf_{\alpha,\eta}$)) $\geq$ TH($ImG$): Mask    236

Audio ?    238    N    244

240

For Each of at Least One Class $CLS_\eta$

Use Natural Language Processor (NLP) to Search For
Each Audio Feature $saf_{\gamma,\eta}$ in set SAF

$RCON(Audio) = \sum_{\alpha,\beta} n(saf_{\gamma,\eta}) \cdot CON(saf_{\gamma,\eta})$
$UCLR(Audio) =$
$\sum_{\alpha,\delta} n(saf_{\alpha,\delta}) \cdot CON(saf_{\gamma,\eta}) \cdot \mathcal{H}(CLR(saf_{\gamma,\eta}) - CON(saf_{\gamma,\eta}))$ If (RCON-UCLR) $\geq$ TH($Audio$): Go To Block 250 to
Deny Access and END;
Else If (CON($saf_{\gamma,\eta}$)-CLR($saf_{\gamma,\eta}$)) $\geq$ TH($Audio$):Mask    242

If RCON($TxT$) $\geq$ TH($TxT$-$Wmark$), RCON($ImG$) $\geq$ TH($ImG$-$Wmark$),
or RCON($Audio$) $\geq$ TH($Audio$-$Wmark$) WaterMark    244

Approve Request and END    248

Deny Request and END    250

FIG 3C

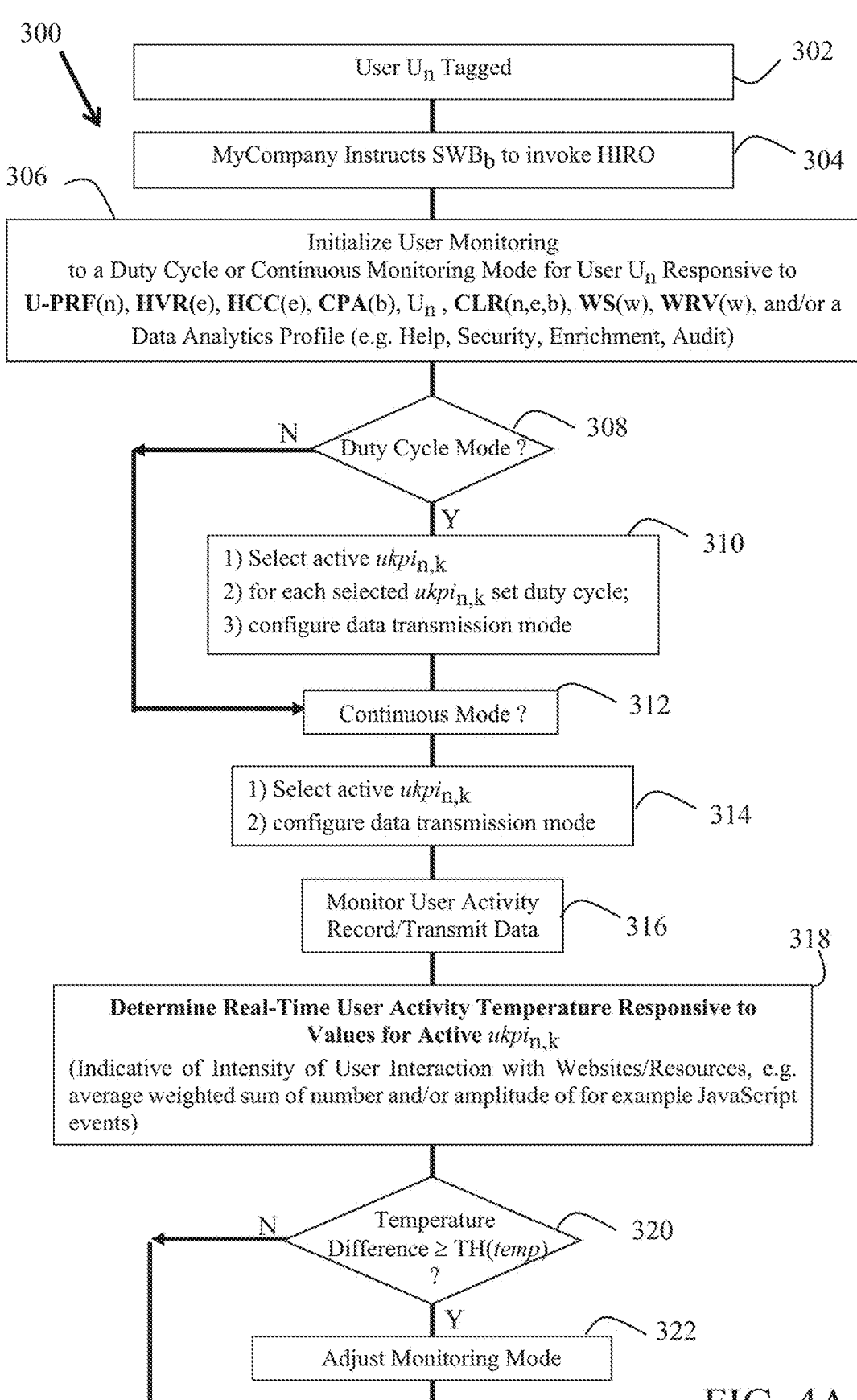

300

302
User $U_n$ Tagged

304
MyCompany Instructs $SWB_b$ to invoke HIRO

306
Initialize User Monitoring
to a Duty Cycle or Continuous Monitoring Mode for User $U_n$ Responsive to
U-PRF(n), HVR(e), HCC(e), CPA(b), $U_n$ , CLR(n,e,b), WS(w), WRV(w), and/or a
Data Analytics Profile (e.g. Help, Security, Enrichment, Audit)

308
Duty Cycle Mode ?          N 310
1) Select active $ukpi_{n,k}$
2) for each selected $ukpi_{n,k}$ set duty cycle;
3) configure data transmission mode 312
Continuous Mode ?

314
1) Select active $ukpi_{n,k}$
2) configure data transmission mode

316
Monitor User Activity
Record/Transmit Data

318
**Determine Real-Time User Activity Temperature Responsive to
Values for Active** $ukpi_{n,k}$ (Indicative of Intensity of User Interaction with Websites/Resources, e.g.
average weighted sum of number and/or amplitude of for example JavaScript
events)

320
Temperature
Difference ≥ TH(*temp*)
?          N

Y

322
Adjust Monitoring Mode

USER ACTIVITY AUDITING OF RESOURCE TRAVERSAL ACROSS CONNECTED COMPANY NODES

RELATED APPLICATIONS

The present application is a Continuation of PCT Application No. PCT/IL2023/050652, filed on Jun. 22, 2023, which claims the benefit under 35 U.S.C. 119(e) of U.S. Provisional Application 63/354,896 filed on Jun. 23, 2022, the disclosures of which are incorporated herein in their entirety by reference.

FIELD

Embodiments of the disclosure relate to providing cyber-secure access channels and workspaces for communications networks and digital resources.

BACKGROUND

The various computer and communications technologies that provide modem communications networks and the internet, encompass a large variety of virtual and bare metal network elements (NEs) that support operation of the communications networks and the stationary and/or mobile user equipment (UE) that provide access to the networks. The technologies have enabled the information technology (IT) and the operations technology (OT) that are the bedrocks of today's society and provide a plethora of methods, devices, infrastructures, and protocols for controlling industrial equipment, supporting business operations, and generating and propagating data, voice, and video content via the internet. Information of all types is readily available through the internet to most of the global population, independent of physical location. And today large segments of the global community regularly work remotely from their homes, coffee shops, and vacation venues via connectivity to their employers and work groups using their personal, Bring Your Own Device (BYOD), UEs—such as their personal smartphones, laptops, tablets, and home desktops. The networks have democratized the consumption of information and accelerated changes in societal infrastructure.

However, the benefits provided by the computer and communications technologies are not without their costs. The same technologies and benefits have substantially increased the difficulty in providing and maintaining legitimate personal and collective rights to confidentiality, and in protecting the integrity and safety of the selfsame industrial and business operations that the technologies have enabled against violation and damage from cyberattacks.

For example, a fingerprint of cyberattack surfaces characterizes each UE, whether it is a personal, spatially untethered BYOD or an enterprise, workplace user equipment (WPUE) and provides vulnerabilities for exploitation by malicious hackers to wreak havoc possibly on the UE and more often on entities and systems to which the UE connects. Each UE, and in particular a BYOD, in addition to functioning as a person's communications node, is a potential cyberattack node for any communications network to which the UE connects. For enterprises that must be in contact with clients, workers, and/or associates that have segued at least in part to remote work using their personal BYODs, vulnerability to cyberattack is amplified by a number of their remote contacts, the software configurations in the contacts' respective BYODs, and the manifold of non-enterprise communications that the contacts engage in using the UEs. The gravitation of enterprise data and storage resources to the cloud and the proliferation of technologies such as Infrastructure as a Service (IaaS), Platform as a Service (PaaS), and Software as a Service (SaaS) that remote contacts access and use further compounds the complexity of providing for appropriate cyber protection.

SUMMARY

An aspect of an embodiment of the disclosure relates to providing a cyber secure communications system, optionally referred to as a CyberSafe system or simply "CyberSafe", that provides enhanced visibility and management of communications traffic propagated by the system. CyberSafe leverages the enhanced visibility to provide improved cyber protection for, and secure access to a digital resource of a body of resources for an authorized user of a UE—a BOYD or a WPUE—associated with the body of resources.

Digital resources include any information in digital format, at rest or in motion, and comprise by way of example electronic documents, images, files, data, databases, and/or software, which refers to executable code and/or data. Digital resources also include any software and/or hardware that may be used to operate on or generate a digital resource. A digital resource in motion is a digital resource that is being used, and/or operated on, and/or in transit between nodes of a communication system. A digital resource at rest is a digital resource that is in storage and not in motion.

For convenience of presentation, it is assumed that the body of digital resources is owned by an enterprise, optionally referred to as "MyCompany", that employs or engages in tasks with users authorized to use a UE associated with the body of resources to access a MyCompany resource. A UE associated with the body of resources is a UE that has been configured in accordance with an embodiment of the disclosure to enable an authorized user access to a MyCompany resource and may be referred to as a MyCompany UE. A user authorized to use a MyCompany UE to access a MyCompany resource may be referred to as a MyCompany user or simply a user.

In an embodiment CyberSafe comprises an, optionally cloud based, data and processing security hub, also referred to as a CyberSafe hub, and a web browser, also referred to as a CyberSafe secure web browser (SWB), resident in a CyberSafe isolated secure environment (CISE) of a MyCompany UE configured by, or in accordance with, CyberSafe. In an embodiment, CISE operates to isolate software comprised in the SWB and in other applications that may reside in CISE from software in the UE, also referred to as UE ambient software, that may be used for tasks not associated with MyCompany resources, and from software external to the UE. In an embodiment the SWB monitors and controls movement of data into and out from CISE and between applications in CISE and access to MyCompany resources to enforce CyberSafe and/or MyCompany security policies. In an embodiment Cybersafe supports high resolution monitoring and control of motion of data into and out from CISE and propagation of data by the communications system by configuring the SWB to provide high visibility to the motion of the data. Providing high visibility comprises making communications outgoing from CISE visible before the SWB encrypts the outgoing communications and communications incoming into CISE after the SWB decrypts the incoming communications. The isolation and control of movement and access to data, and enforcement of security policies in accordance with an embodiment of the disclosure operate to provide enhanced protection against cyber damage and security against leakage of data from and/or into MyCompany resources that may result from communication with and via a MyCompany UE.

In an embodiment monitoring and controlling motion of digital data comprises vetting information content of the data and controlling the motion of the data responsive to the vetted content. Vetting content may comprise determining textual, image, audio, and/or video components of the data and processing the components to determine their respective information content. Controlling motion of the data responsive to data content may comprise denying access to the data, masking or deleting a portion of the data, and/or watermarking the data optionally responsive to assessments of confidentiality of the data and clearance of a user engaging with the data Monitoring and controlling data motion may comprise monitoring user behavior operating and using a MyCompany UE to determine user key performance indicators (U-KPIs) that characterize the user behavior when interacting with the MyCompany UE and MyCompany digital resources and using the U-KPIs to control data motion. Optionally, monitoring user behavior comprises recording and storing at least a portion of a communication session that the user engages in using the MyCompany UE.

Optionally monitoring motion of data may comprise determining and recording trajectories that a digital resource traverses between communication nodes comprised in CyberSafe and/or between a CyberSafe node and a node external to Cybersafe and changes that the resource may undergo at the nodes. Communication nodes comprise by way of example, UEs, Websites, and/or CCaaSs (cloud computing as a service) resources. Communication nodes in or external to CyberSafe are nodes that are respectively controlled or not controlled by CyberSafe.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale FIG. 1 schematically shows a MyCompany UE configured having a CyberSafe CISE and SWB to provide cyber security to an enterprise referred to as MyCompany, in accordance with an embodiment of the disclosure;

FIGS. 2A-2C show a flow diagram of a procedure by which the SWB shown in FIG. 1 may engage in a handshake with a CyberSafe hub to acquire a token for use in accessing a MyCompany resource, in accordance with an embodiment of the disclosure;

FIGS. 3A-3C show a flow diagram of a procedure by which access and motion of a MyCompany resource may be controlled responsive to data content of the resource in accordance with an embodiment of the disclosure;

FIGS. 4A-4B show a flow diagram of a procedure by which the SWB shown in FIG. 1 may operate to implement a high resolution observation procedure for observing activity of a MyCompany user interacting with a MyCompany resources, in accordance with an embodiment of the disclosure.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily a required configuration of possible embodiments of the disclosure. Unless otherwise indicated, the word "or" in the description and claims is considered to be the inclusive "or" rather than the exclusive or, and indicates at least one of, or any combination of more than one of items it conjoins. Whereas features and actions of flow diagrams shown in the figures and discussed in the specification are presented and discussed substantially in a sequential order prescribed by sequential block numbers referencing blocks in the figures, actions presented in the blocks may be undertaken simultaneously or in orders that are not prescribed by the block numbers.

Figure 1:
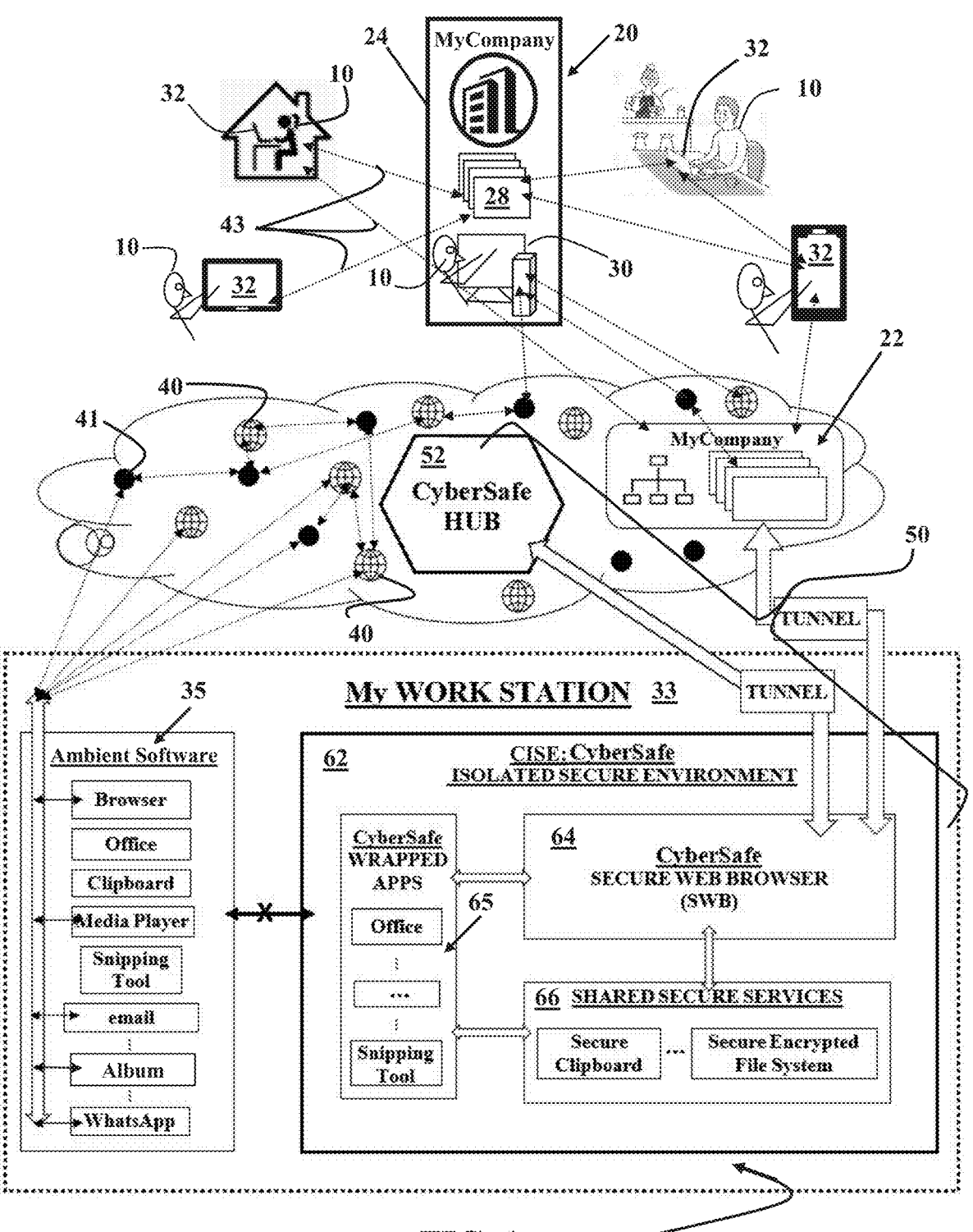

FIG. 1 schematically shows a CyberSafe system 50 that operates to provide cyber secure communication for a communications network of an enterprise 20, also referred to as MyCompany 20 or simply MyCompany, and for MyCompany users 10 that use the communications network, in accordance with an embodiment of the disclosure. MyCompany may have cloud based digital resources 22, premises 24 housing on-premises servers (not shown) for storing and processing MyCompany on-premises digital resources 28, and WPUEs 30 for use by MyCompany users 10 when on-premises for accessing, using, and processing the cloud based and on-premises resources to conduct MyCompany business. MyCompany may permit users 10 when off-premises to access MyCompany resources from various locations using any of various types of BYODs 32. It is assumed that MyCompany users 10 may use their respective BYODs 32 for personal activities, and that MyCompany users when on-premises may, in accordance with permissions defined by MyCompany policy, be allowed to use WPUEs 30 for personal activities. Personal activities may include web browsing, social networking, uploading, and downloading material, via the cloud infrastructure of communication nodes 41 and websites 40. The MyCompany network, may be required to support, as schematically indicated by double arrowhead dashed lines 43, communication between any of various combinations of MyCompany on-premises digital resources 28, cloud based digital resources 22, on-premises users 10 using WPUEs 30 installed in a MyCompany premises 24, and off-premises users 10 using BYODs 32 at various off-premises locations.

In accordance with an embodiment of the disclosure CyberSafe 50 comprises an optionally cloud based Cyber-Safe processing and data hub 52 and a software architecture 60 that operates to cyber protect MyCompany communications and digital resources in each of a plurality of MyCompany UEs, BYODs 32, and/or WPUEs 30 used by MyCompany users 10 to access and use MyCompany resources. CyberSafe hub 52 comprises and/or has access to cloud based and/or bare metal processing and memory resources required to enable and support functionalities that the hub provides to CyberSafe 50 and components of CyberSafe.

By way of example, FIG. 1 schematically shows Cyber-Safe software architecture 60 that configures a MyCompany UE 33, to protect MyCompany digital resources, at rest and/or in motion, and provides cyber secure access to the resources for a user 10 that may use MyCompany UE 33. MyCompany UE 33 may be a BYOD or a WPUE and be referred to as My-WorkStation 33.

Architecture 60 comprises a CyberSafe isolated environment, CISE 62, that is isolated from ambient software 35 resident in My-WorkStation 33 and comprises a SWB 64, resident in CISE 62. Ambient software 35 may typically include data and applications that are not intended for use in conducting MyCompany business. By way of example, ambient software 35 may comprise a browser, an office suite of applications, a clipboard, an album of family images, a photo album and WhatsApp. CISE 62 may also include a set 65 of applications optionally imported from ambient software 35 and wrapped and optionally containerized by CyberSafe to associate cybersecurity features required by CyberSafe and/or MyCompany policy features with the applications. In an embodiment CISE comprises an ensemble of shared secure services 66 that may be accessed for use by SWB 64 and by applications in set 65 via SWB 64. Shared secured service 66 optionally comprise a secure clipboard and a secure encrypted File System.

CISE 62 provides an isolated security domain delimited by a substantially continuous security perimeter generated and supported by security applications, features, and functionalities of SWB 64, shared secure services 66, and wrapping of wrapped applications 65. In accordance with an embodiment, CISE 62 may be configured to provide cyber security and isolation using methods of, and compliant with, such standards as PCI DSS (Payment Card Industry Data Security Standard), HIPAA (Health Insurance Portability and Accountability Act), and/or SOC2 (American Institute of CPAs' Service Organization Control). Optionally CISE 62 is isolated from the ambient software on the network level.

In an embodiment to provide isolation and security SWB 64 is configured to monitor and control ingress and egress of data respectively into and out from CISE 62 and between applications in CyberSafe wrapped applications 65, shared secure services 66 and/or SWB 64. SWB 64 is advantageously configured by CyberSafe to enforce CyberSafe and/or MyCompany security policies relevant to access to MyCompany data and movement of data within and into and out from CISE. The isolation and control of movement of and access to data, and enforcement of policies operate to provide enhanced protection against cyber damage and security against leakage of data from and/or into MyCompany resources that may result from communication with and via a MyCompany UE.

In an embodiment monitoring ingress and egress of data comprises monitoring communications supported by SWB 64, storing and processing data comprised in the monitored communications and making the data available to the Cyber-Safe hub and to MyCompany IT. In an embodiment, monitoring is performed on communications outgoing from CyberSafe isolated environment CISE 62 (FIG. 1) before the outgoing communications are encrypted by $SWB_b$ and on communications incoming into CISE after the incoming communications are decrypted by SWB 64. As a result, user browsing is substantially completely visible to CyberSafe and to MyCompany and can be processed locally or remotely.

Monitoring may be substantially continuous, stochastic, or periodic. Stochastic monitoring comprises monitoring communications for monitoring periods of limited duration that begin at onset times that are randomly determined, optionally in accordance with a predetermined probability function or in response to a "trigger" event such as an event that is considered anomalous and warrants attention. Periodic monitoring comprises continuous monitoring of communications during monitoring periods at periodic onset times. Monitored communications may be mirrored by SWB 64 to a destination in CyberSafe hub and/or MyCompany for storage and/or processing or may be filtered for data of interest before being transmitted to a destination in Cyber-Safe hub and/or MyCompany for storage and/or processing. Features and constraints that configure how monitored communications are handled by SWB 64 may be determined based on CyberSafe and/or MyCompany policy. Such policy may specify how processing of data is shared between the local SWB and the CyberSafe hub.

In an embodiment, SWB 64 may be an independent application comprising CyberSafe features and/or functionalities, or an existing web browser, such as Google Chrome, Microsoft Edge, Apple Safari, Mozilla Firefox, Opera, or Brave, modified and provided with additional CyberSafe features and/or functionalities by changes and/or additions to browser code and/or by integrating with CyberSafe extensions. The features and functionalities may be incorporated into the existing browser and the browser converted to a CyberSafe SWB by: interfacing with the input and output of the existing browser using operating system hooks; patching the original binary of the browser; building a dedicated extension on top of the browser's API and/or SDK; and/or dynamically modifying memory of the browser when the browser is in operation.

By way of example, the features and/or functionalities, hereinafter generically referred to as functionalities, may comprise, at least one or any combination of more than one of functionalities that enable SWB 60 to: cooperate with a MyCompany IDP to verify and authorize a user 10 to access CISE 62 and MyCompany resources; acquire data characterizing websites visited by MyCompany users that may be used to classify cyber risks associated with the websites; acquire data characterizing browser extensions that may compromise SWB 64 security features; acquire data that may be processed to determine normal behavior and use of MyCompany resources by MyCompany users as a group and/or as individuals; monitor engagement of a MyCompany user with a MyCompany resource and control the engagement to enforce CyberSafe and/or MyCompany security constraints.

In an embodiment enforcing CyberSafe and/or MyCompany security constraints comprises requiring that all communications between UE 33 and a MyCompany resource be propagated via SWB 64 and CyberSafe tunnels that connect the SWB to the resource and enforcing CyberSafe and/or MyCompany permissions to the resources. Optionally, enforcing security constraints comprises identifying anomalies in communications between UE 33 and a company resource and operating to eliminate or ameliorate damage from an identified anomaly and generate an alert to its occurrence.

Figure 2B:
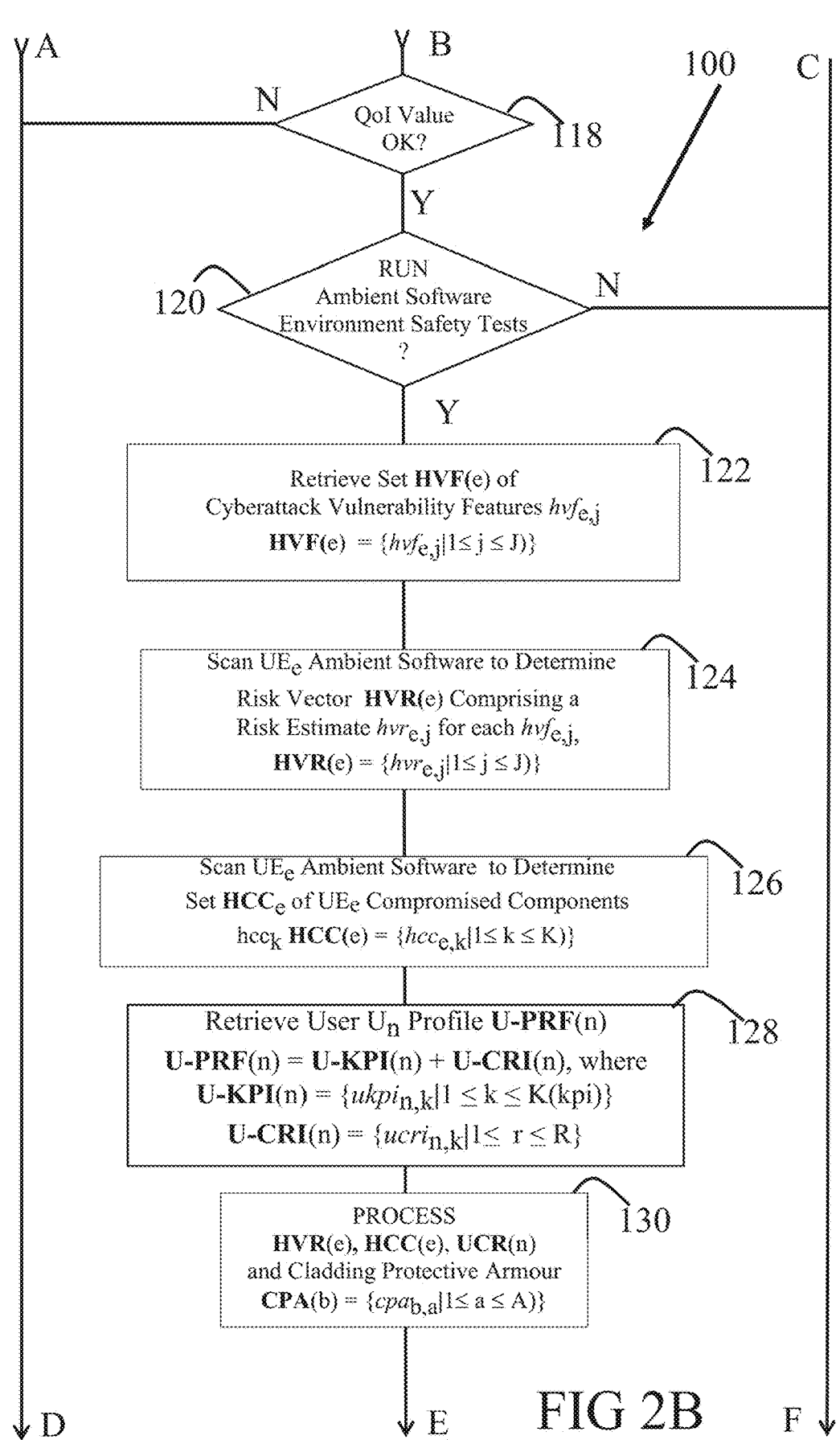
Figure 2C:
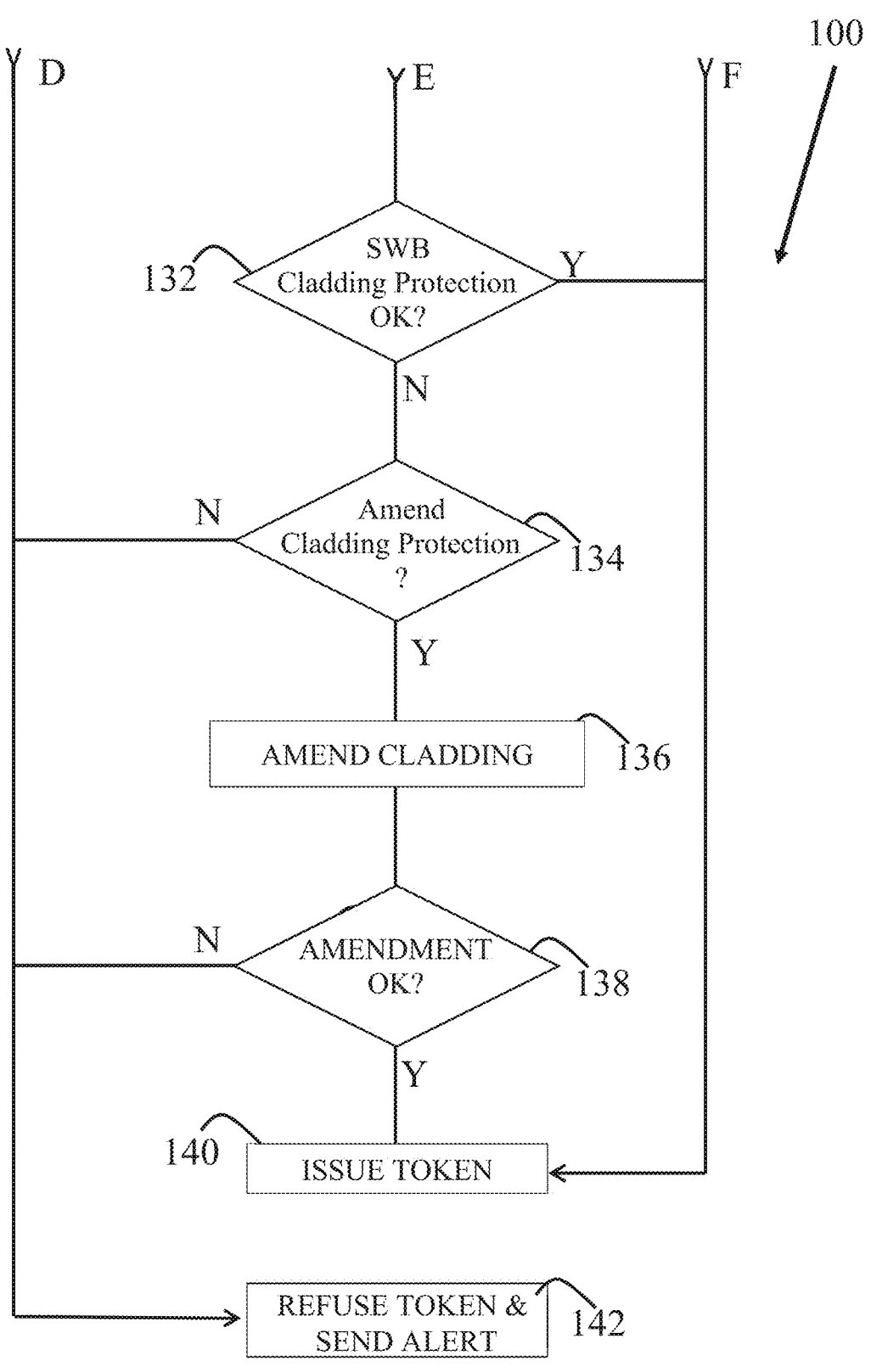

Flow diagrams presented in FIGS. 2A-5 show elements of procedures performed by a CyberSafe System and an SWB, such as CyberSafe system 50 and SWB 64, that exhibit and illustrate functionalities of the CyberSafe system and of the SWB, in accordance with an embodiment. The discussion assumes that the CyberSafe system provides cyber security services to a given MyCompany enterprise having a plurality of users $U_n (1 \leq n \leq N)$ identified by respective user IDs, $U\text{-}ID_n$ $(1 \leq n \leq N)$. The users are assumed to have access to and use user equipment identified by user equipment IDs, $UE\text{-}ID_e$ $(1 \leq e \leq E)$, and that CyberSafe has configured the UEs with CISEs and CyberSafe browsers, $SWB_b$, $(1 \leq b \leq B)$, identified by SWB browser IDs, $B\text{-}ID_b$ FIGS. 2A-2C show a flow diagram 100 of a procedure by which a given user $U_n$ using user equipment $UE_e$ contacts CyberSafe security hub 52 to request authorization to access and use CISE in $UE_e$ and have a resident $SWB_b$ in CISE issued a security token for access to MyCompany resources.

In a block 102 user $U_n$ operates $UE_e$ to sign in to CyberSafe security hub 52 and submit a request for the security token, the request comprising an Extended ID that includes: the user ID, $U\text{-}ID_n$; the user equipment ID, $UE\text{-}ID_e$; and a $SWB_b$ ID, $B\text{-}ID_b$ that identifies the SWB installed in $UE_e$. $U\text{-}ID_n$ may include the username, a password, and/or such data that associates the user with $UE_e$, $SWB_b$, and/or MyCompany, such as a date at which the user was first registered as a MyCompany user. $UE\text{-}ID_e$ may include any suitable identifier such as a MAC (media access) address, a UUID (Universal Unique Identifier), or an IMSI (international mobile subscriber identity), and/or information that associates $UE_e$ with user $U_n$, $SWB_b$, and/or MyCompany. The $B\text{-}ID_b$ may include a browser user agent string, any suitable identifier that CyberSafe assigns $SWB_b$, and/or information that associates $SWB_b$ with $UE_e$, $U_n$, and/or MyCompany.

It is noted that a given user $U_n$ may be associated with more than one $UE_e$ and/or more than one $SWB_b$, and the user ID $U\text{-}ID_n$ may comprise data that identifies the associations. Similarly, a given user $UE_e$ may be associated with more than one $U_n$ and/or more than one $SWB_b$, and a given $SWB_b$ with more than one $U_n$ and/or more than one $UE_e$, and the respective IDs, $UE\text{-}ID_e$ and $B\text{-}ID_b$ may comprise data that maps the associations. Any combination of one or more of $U_n$, $UE_e$, and/or $SWB_b$ may comprise a Time of Day (ToD) for each of at least one previous sign in to CyberSafe.

Optionally, in a block 104 the CyberSafe Security Hub authenticates the Extended ID. Authenticating the Extended ID may comprise engaging in a multifactor, optionally a three factor, authentication of user $U_n$ and determining consistency of the associations and/or ToDs between any combination of two or more of $U\text{-}ID_n$, $UE\text{-}ID_e$, or $B\text{-}ID_b$.

In a decision block 106 if the Extended ID is not OK the hub proceeds to a block 142, denies the requested token, and optionally sends an alert of the refusal to the CyberSafe hub. On the other hand if the Extended ID is OK the hub optionally proceeds to a decision block 108 to decide whether or not to run an integrity test on the $SWB_b$ software. The decision to run or not to run an integrity test may depend on a MyCompany and/or CyberSafe testing policy. The policy may depend on when the CyberSafe hub ran a last integrity test on the $SWB_b$, and/or $UE_e$, a user profile characterizing user $U_n$ browsing behavior and internet use pattern, and/or a feature of a cyberattack landscape. For example, MyCompany may have a policy that a delay between integrity tests be no less than or greater than certain lower and upper bound delays. A decision may depend on whether user $U_n$ browses to cyber dangerous websites listed in a list of dangerous websites at a frequency greater than a predetermined frequency or whether the user tends to be lax in updating passwords or patching applications. A cyberattack landscape may comprise frequency and/or severity of cyberattacks that have recently been experienced by MyCompany or other enterprises and/or what types of cyberattacks have been encountered. Optionally, if the decision in decision block 108 is to skip an integrity test, the hub proceeds to a block 140 and issues the desired token. If the decision is to undertake an integrity test, the hub may proceed to a block 110 and retrieve from a database the hub comprises or to which the hub has access, a set, "SIT", of at least one software integrity test, "$sit_1$", where $SIT = \{sit_1 | 1 \leq i \leq I\}$ that may be used to determine integrity of the $SWB_b$ software. An exemplary SIT may comprise at least one, or any combination of more than one of:

$$sit_1 = CRT \text{ (challenge response test)};$$

$$sit_2 = BAT \text{ (behavioral attestation test)};$$

$$sit_3 = AV \text{ (anitvirus check)};$$

$$sit_4 = EDR \text{ (endpoint detection and response)};$$

$$sit_5 = BDS \text{ (binary digital signing)};$$

$$\vdots$$

$$sit_I$$

In a block 112 the CyberSafe hub determines a weight vector WIT comprising a weight $wit_1$ for each $sit_1$ that provides an estimate for how appropriate the test $sit_1$ is for determining integrity of the $SWB_b$ software. In an embodiment a $wit_1$ for a given $sit_1$ is a function of:

$UE_e$ hardware type, for example if the $UE_e$ is a mobile device, a tablet, or desktop which may limit what types of the given $sit_1$, may be performed on the $UE_e$;

sensitivity, the true positive rate of the given $sit_1$;

specificity, the true negative rate of the given $sit_1$;

nuisance rating, which provides a measure of inconvenience performance of the test causes user $UE_e$;

past performance of the test; and/or a current cyberattack context, which identifies current prevalence and severity of cyberattack types.

In a block 114 CyberSafe hub runs a selection of tests $sit_1$ on $SWB_b$ software responsive to their respective weights $wit_1$, for example where a greater weight $wit_1$ indicates greater relevance, by selecting integrity tests $sit_1$ for which their respective weights are greater than a median weight $wit_1$.

In a block 116 CyberSafe hub determines a value for a measure of a QoI(e,b) (quality of integrity) for $SWB_b$ software in $UE_e$ responsive to a measure of integrity returned by each of the selected tests $sit_1$. In an embodiment QoI(e,b) is an average of the measures of integrity provided by the $sit_1$ weighted by their respective weights $wit_1$. Optionally in a decision block 118 CyberSafe hub 52 determines if the QoI value is satisfactory or not. If the QoI is not satisfactory the hub proceeds to block 142 and denies issuing the token and optionally sends an alert. On the other hand if the QoI is satisfactory the hub proceeds to a decision block 120 to determine whether or not to run ambient software environment tests on $UE_e$ Software environment tests are tests to determine to what extent, if at all, ambient software in $UE_e$ has been compromised by cyber damage or is insufficiently protected against cyber damage. The decision whether or not to perform the environment test on $UE_e$ may be based on many of the same considerations that are weighed when making the decision as to whether or not to perform integrity tests. For example, the decision may depend on MyCompany and/or CyberSafe policy and such factors as $UE_e$ hardware, for example whether the $UE_e$ is a mobile phone or laptop, when a last environment test was run on $UE_e$, a browsing behavior pattern of user $U_n$, and/or a feature of a cyberattack landscape.

Optionally, if the decision in decision block 120 is to skip the software environment test, the CyberSafe hub may proceed to block 140 and issue the desired token. If on the other hand the decision is to undertake an environment test, the hub may optionally proceed to a block 110 and retrieve from a database a set "HVF(e)" of at least one cyberattack vulnerability feature $hvf_{e,j}$ to be determined as present or absent, where $HVF(e)=\{hvf_{e,j}\|1\leq j\leq J\}$. HVF(e) may comprise static and/or dynamic vulnerability features. Static vulnerability features are features that are code and/or data elements comprised in the ambient software of $UE_e$ that are considered to render the ambient software and/or digital resources that are not comprised in the ambient software, such as CyberSafe and/or MyCompany resources, vulnerable to cyberattack. Dynamic vulnerability features are temporary vulnerability features, such as whether the $UE_e$ is connected to a public WiFi or to a cyber dangerous website, that characterize a current use of $UE_e$. An exemplary HVF(e) may comprise at least one, or any combination of more than one of vulnerability features whose presence or absence may be determined by response to, optionally, the following queries:

$hvf_{e,1} =$ $AV$ (anti–virus)/$EDR$ (Endpoint Detection & Response) installed?;

$hvf_{e,2} =$ firewall installed and enabled?;

$hvf_{e,3} = OS$ (operating system) patched to the latest version?;

$hvf_{e,4} =$ applications patched to latest versions?;

$hvf_{e,5} =$ access to $UE_e$ require authentication?;

$hvf_{e,6} =$ dangerous software defaults present?;

$hvf_{e,7} =$ is public $Wi$–$Fi$ being used?;

$hvf_{e,8} = UE_e$ connected to a $VPN$(virtual private network)?;

$hvf_{e,9} =$ security level of connected network?;

$hvf_{e,10} =$ security misconfigurations?;

$hvf_{e,11} =$ cross site scripting?;

$hvf_{e,12} =$ erratic power provision?;

$\vdots$ $hvf_{e,J}$.

Optionally, in a block 124 CyberSafe hub scans the $UE_e$ ambient software environment to detect presence of each $hvf_{e,j}$ and determine a risk vector HVR(e) comprising a cyberattack risk estimate $hvr_{e,j}$ for each $hvf_{e,j}$, where HVR (e)=$\{hvr_{e,j}\|1\leq j\leq J)\}$. Determining a risk estimate for a given vulnerability $hvf_{e,j}$ is generally dependent on the type of vulnerability and a cyberattack landscape. For example, determining a risk estimate for a given public Wi-Fi may be dependent on a physical locations of the Wi-Fi, current traffic carried by the Wi-Fi at a time for which the estimate is made, and recent history of cyberattacks attempted via the Wi-Fi. Risks associated with patching may be a function of types of patching required or installed.

In a block 126 CyberSafe may scan $UE_e$ ambient software to determine a set HCC(e) of compromised components $hcc_k$ in the ambient software, where HCC(e)=$\{hcc_{e,k}\|1\leq k\leq K\}$. And in a block 128 CyberSafe may retrieve from a Cyber-Safe and/or MyCompany database a user profile U-PRF(n) that may be used to characterize behavioral features of user $U_n$ when interacting with MyCompany and/or non-MyCom-pany digital resources. In an embodiment U-PRF(n) comprises a set U-KPI(n) of key performance indicators (KPIs) values for user key performance indicators $ukpi_{n,k}$, where U-KPI(n)=$\{ukpi_{n,k}\|1\leq k\leq K\}$, and a user cyber risk profile U-CRP(n) comprising values for user risk components $ucrp_{n,r}$, where U-CRP(n)=$\{ucrp_{n,r}\|1\leq r\leq R\}$. U-KPI(n) may include values for at least one, or any combination of more than one of: user keyboard typing patterns; user mouse activity patterns; user response time to digital resource actions, use of wrapped apps; use of shared secure services; data patterns used by the user during the session, including data typed locally in the SWB; files uploaded and down-loaded, filenames; interruptions to use ambient software; and/or hover times at particular web pages. Values for U-CRP(n) components may include risk estimates values, optionally derived from U-KPI(n) components values, for at least one or any combination of more than one of: careless password management; careless permissions management; reckless clicking on actionable content; deficient sensitivity to phishing bait; or risk estimate for user abusing privilege to MyCompany resources.

In a block 130 CyberSafe processes HVR(e), HCC(e), U-PRF(n), and/or a set CPA(b) of values that provide measures of security that software, such as anti-injection and/or anti-exploitation software, optionally referred to as cladding, provides to protect the $SWB_b$ from cyber damage. For example, for a user with high privilege, access to MyCompany resources may be required by CPA(b) to run additional security checks and install additional security controls, such as EDR, in order to allow user access a MyCompany resource. Additionally, some capabilities that have impact on the system's vulnerability to cyberattacks may be constrained or disabled by CPA(b) if the user is accessing an unknown website or a website with low secu-rity reputation and therefore high risk. In an embodiment processing is performed by a neural network configured to operate on an input feature vector comprising component features based on components of HVR(e), HCC(e), U-PRF (n), and/or CPA(b).

Optionally, in a block 132 if the CyberSafe hub deter-mines that the cladding protection is advantageous, the hub proceeds to block 140 and issues the requested token. If on the other hand the cladding protection is not advantageous, the hub may proceed to a block 134 to determine whether or not to amend the cladding protection to improve protection. If the hub decides not to amend, the hub may proceed to block 142 and deny the token and raise an alert. On the other hand if the decision is to amend the cladding, the hub proceeds to a block 136, amends the cladding and optionally proceeds to a decision block 138 to determine if the amendment has resulted in sufficient improvement in cyber protection or not. If the improvement is not sufficient CyberSafe hub proceeds to block 142 and denies the token.

In an embodiment once a MyCompany user $U_n$, user equipment $UE_e$, and browser $SWB_b$ have been provided with a token, optionally as illustrated by flow diagram 100, for presentation to interact with MyCompany resources, the SWB may be configured to provide vetting of access to and control of motion of the resources based on information content of the resources in accordance with an embodiment of the disclosure. FIG. 3A-3C show a flow diagram 200 that illustrates a procedure, optionally referred to as an information content authorization procedure (ICAP), by which CyberSafe, MyCompany, and/or $SWB_b$ may cooperate to provide control of access and motion of a MyCompany resource with which user $U_n$ attempts to engage, in accordance with an embodiment of the disclosure.

In a block 202 user $U_n$ submits, optionally an extended ID, comprising a $U\text{-}ID_n$, a $UE\text{-}ID_e$ and a $B\text{-}ID_b$, to request a MyCompany security token from CyberSafe hub 52. In a decision block 204 CyberSafe vets the extended ID to determine if the security hub requirements are satisfied and in a block 206, if they are satisfied, grants the requested token.

Optionally in a block 208 SWB downloads and/or is provided with access to a MyCompany user profile, U-PRF (n)=(U-KPI(n) U U-CRP(n)) for user $U_n$, confidentiality levels, CON, for information sensitive features of MyCompany resources, and a user clearance profile CLR(n,e,b) for user $U_n$ comprising user clearance levels, CLR, for access to the information sensitive features. An information sensitive feature, also referred to as a confidentiality sensitive feature, is any information feature of a resource that is considered by MyCompany to advantageously require limited distribution to MyCompany users based on user clearance levels. Limited distribution may be determined and implemented by assigning each information sensitive feature a confidentiality level, CON, and each MyCompany user a corresponding clearance level, CLR, for the information sensitive feature. Optionally, CON may assume a value for a confidentiality level for a given information sensitive feature equal to any integer value from an advantageous range of integers, $(1\text{-}C_m)$, with larger values indicating higher confidentiality levels demanding more stringent constraints for access to the feature than lower values. CLR clearance levels may assume any value from the same range of values as CON. A user may be allowed access to a given confidentially sensitive feature only if the user is assigned a CLR level greater than or equal to a CON level of the feature. CON and CLR levels may by way of example be determined by consideration of MyCompany personnel or by using an artificial intelligence (AI) for example, a machine learning algorithm, such as a decision tree or clustering algorithm, or a convolutional neural network (CNN), educated by supervised and/or unsupervised learning.

The confidentiality levels may comprise sets of confidentiality levels STF, SIF and SAF for confidentiality sensitive text features that are character strings, optionally regex (regular expression) strings, image features, and audio features respectively that a MyCompany digital resource may include. Confidentiality levels for video material which comprises a sequence of images generally associated with audio material and/or textual material such as for example, a tickertape or explanatory or labeling signage, may be determined based on relevant material from STF, SIF and/or SAF with appropriate processing to account for temporal correlations.

Set STF optionally comprises a confidentiality level CON $(stf_{\alpha,\ \eta})$ for a confidentiality sensitive text feature $stf_{\alpha,\ \eta}$ of plurality of $\alpha$ $(1{\leq}\alpha{\leq}\alpha_m)$ confidentiality sensitive text features and each of at least one data class, $CLS_\eta$ $(1{\leq}\eta{\leq}\eta_m)$, to which the text feature belongs. A confidentiality sensitive text feature may be any text object or function of a text object that is considered to comprise by itself or in combination with at least one other text object confidentiality sensitive information. By way of example, a confidentiality sensitive text feature may be or comprise a character string, such as a regex (regular expression) string, an N-gram, a pattern of text features, for example a cluster of at least two associated text phrases at a spatial distance from each other in a resource, or a confidentiality sensitive text feature from a cluster of confidentiality text features related to each other by a textual similarity distance. A confidentiality sensitive text feature may by way of example comprise or otherwise indicate or disclose marketing data, such as release data for a new product or a feature of a new advertising campaign, financial data such as a profit or loss statement, management data, such as an employee evaluation, and/or technical data such as a chemical formula or detail of a manufacturing process. A data class $CLS_\eta$ may be any of a plurality of $\eta$ classes that MyCompany may consider advantageous for classifying information for limited distribution. And as indicated by the above examples of confidentiality sensitive text features, the data classes may by way of example comprise a class for each of marketing data, financial data, management data, technical data, and/or RnD data. In an embodiment data classes may by way of example be determined by consideration of MyCompany personnel or by using an artificial intelligence (AI) for example, a machine learning algorithm, such as a decision tree or clustering algorithm, or a convolutional neural network (CNN), educated by supervised and/or unsupervised learning.

Similarly, set SIF optionally comprises a confidentiality level $CON(sif_{\beta,\eta})$ for each confidentiality sensitive image feature $sif_{\beta,\eta}$ of a plurality of $\beta$ $(1{\leq}\beta{\leq}\beta_m)$ image features and at least one data $CLS_\eta$ used to classify confidentiality sensitive text feature data, to which the image feature is considered to belong. A confidentiality sensitive image feature may be any image feature, or function of an image feature that is considered to comprise by itself or in combination with at least one other image feature confidentiality sensitive information. By way of example, a confidentiality sensitive image feature may be an image of a new product such as a new sport shoe, a revenue graph, or a management chart. A confidentiality sensitive image feature may be a feature derived from an image. For example, a new armored personnel carrier (APC) may not be confidential per se, but a feature, such as vertical tire distortion derived from an image of the APC, may be considered confidentiality sensitive because weight or loading of the APC may be derived from the distortion.

Similarly, set SAF optionally comprises a confidentiality level $CON(saf_{\gamma,\ \eta})$ for each confidentiality sensitive audio feature $saf_{\gamma,\eta}$ of a plurality of $\gamma$ $(1{\leq}\gamma{\leq}\gamma_m)$ audio features of a soundtrack and at least one data class $CLS_\eta$ to which the audio feature is considered to belong.

Clearance profile set, CLR(n,e,b) optionally comprises clearance levels $CLR_n(stf_{\alpha,\ \eta})$, $CLR_n(sif_{\beta,\eta})$, $CLR_n(saf_{\gamma,\eta})$, for confidentiality sensitive information features $stf_{\alpha,\ \eta}$ $sif_{\beta,\ \eta}$ $saf_{\gamma,\eta}$, which may be generically referred to as $CLR_n$ $(\alpha,\beta,\gamma,\eta)$ or simply CLR.

In a block 210 user $U_n$ uses $SWB_b$ to request access to a particular MyCompany digital resource for authorization to interact with the resource for any of various activities such as for example, navigating, viewing, downloading, uploading, copying, or modifying information. In a decision block 212 MyCompany and/or the particular resource, may determine if $U_n$ using $SWB_b$ satisfies standard authorization requirements by presenting a suitable standard MyCompany permission for access to the resource and satisfying associated ID authentication constraints. The standard authorization requirements do not comprise vetting the resource for confidentiality sensitive information features and configuring access to the document based on confidentiality levels for the features and clearance levels for the user that are additional to the standard MyCompany permission. If the standard authorization requirements are not met, ICAP proceeds to a block 244, denies user $U_n$ access to the resource and ends the procedure.

On the other hand, if the standard authorization procedure associated with block 212 succeeds, ICAP may proceed to a decision block 214 to determine if the resource is a "clearance resource" that requires processing user $U_n$ clearances CLRs and confidentiality levels CONs determined for sensitive information features in the resource to approve authorization. If the resource is not a clearance resource, ICAP proceeds to a block 242, approves the request and ends.

On the other hand, if the resource is a clearance resource, ICAP optionally proceeds to a block 216 to determine if there are any anomalies in the user profile U-PRF(n) and or in the operating environment of the $UE_e$ and $SWB_b$. An anomaly in the user profile U-PRF(n) may, by way of example, be a change in a value for a user key performance indicator, $ukpi_{n,k}$, in the set U-KPI (n), such as the user typing pattern, use of data patterns, or response time, that is greater than a standard deviation from the value for the $ukpi_{n,k}$ downloaded or accessed in block 208. An anomaly in U-PRF(n) may, by way of example, be a change in a value for a user risk estimate $ucrp_{n,r}$ of the set U-CRP (n) such as a risk estimate for reckless clicking on actionable content or careless permissions management greater than a standard deviation from the estimate. Anomalies in the operating environment may by way of example comprise excessive overuse or underuse of MyCompany network bandwidth, unusually labile communications traffic on the network, or frequent interruptions in power supply to the network, or to the user $UE_e$.

If an anomaly is detected, ICAP optionally proceeds from block 216 to a block 218 to adjust confidentiality levels CONs and/or user clearance levels CLRs. For example, for detrimental changes ICAP may increase CON levels and/or decrease user $U_n$ CLR levels. For advantageous changes ICAP may decrease CON levels and/or increase user $U_n$ CLR levels. Following adjustment ICAP may proceed to a block 220 to determine whether the resource comprises text data, image data, audio data, or a mixture of two or more of the data types. If on the other hand no anomaly is detected, ICAP may proceed directly from block 216 to block 220. From block 220 ICAP may proceed to a block 222 to determine data classes $CLS_n$ to which information in the resource may be classified. Determining information types and data classes may be performed by accessing metadata characterizing the resource or by sampling the resource and using a suitable classifier to determine the information type and classes.

Optionally, in a decision block 224, if it has been determined that the MyCompany resource comprises text information, ICAP proceeds to a block 226 to determine optionally for each of at least one data class $CLS_\eta$, to which the resource is classified in block 222, presence of confidentiality sensitive text features $stf_{\alpha,\eta}$ and determines a text confidentiality figure of merit RCON(TxT) for the resource and a text clearance figure of merit UCLR(TxT) for user $U_n$, optionally in accordance with expressions:

$$RCON(T \times T) = \sum_{\alpha,\eta} n(stf_{\alpha,\eta}) \cdot CON(stf_{\alpha,\eta}), \text{ and} \qquad (1)$$

$$UCLR(T \times T) = \qquad (2)$$
$$\sum_{\alpha,\eta} n(stf_{\alpha,\eta}) \cdot CON(sif_{\alpha,\eta}) \cdot \mathcal{H}\big(\big(CLR(stf_{\alpha,\eta}) - CON(stf_{\alpha,\eta}) + \delta\big).$$

In expressions (1) and (2) $n(stf_{\alpha,\eta})$ is a number of times confidentiality sensitive text feature $stf_{\alpha,\eta}$ appears in the resource, $\mathcal{H}$ is the Heaviside function and $\delta$ is a bias value less than one that assures that $\mathcal{H}$ is equal to 1 if CLR $(stf_{\alpha,\eta})=CON(stf_{\alpha,\eta})$.

Optionally, in block 226 if (RCON(TxT)-UCLR(TxT)) is greater than or equal to a predetermined threshold, TH(TxT), ICAP proceeds to a block 250 to deny the request and end. On the other hand if (RCON(TxT)-UCLR(TxT)) is less than the threshold TH(TxT), ICAP may approve the request but operate to locally mask or delete those confidentiality sensitive text features $stf_{\alpha,\eta}$ in the resource for which $(CON(stf_{\alpha,\eta})-CLR(stf_{\alpha,\eta}))$ is greater than a predetermined text masking threshold TH(M TxT).

Local masking or deleting a given text feature $stf_{\alpha,\eta}$ in accordance with an embodiment refers to masking or deleting the given text feature in a version of the resource at the user interface (UI) of a $UE_e$ displaying the resource to a user, without affecting data defining an original version of the resource as received by the $UE_e$. Local masking or deleting is optionally performed by hooking the $SWB_b$ renderer in the $UE_e$ to executable instructions that mask or delete the given feature without affecting the data defining the original resource and as a result is prevented from changing the resource at a source from which it was downloaded to CISE by $SWB_b$. For example, local masking or deleting for a webpage does not change the HTML (Hypertext Markup Language), CSS (Cascading Style Sheets), or JavaScript as received by the $SWB_b$, nor a DOM (Document Object Model) tree for the webpage.

In decision block 224, if text information is not present in the MyCompany resource ICAP proceeds to a decision block 230. In decision block 230, if it has been determined that the MyCompany resource comprises image information, ICAP may proceed to a block 232 to determine probabilities, $\mathcal{P}(sif_{\beta,\eta})$, that image features $sif_{\beta,\eta}$ respectively are present in the image information. Optionally, probabilities $\mathcal{P}(sif_{\beta,\eta})$ are determined by processing the image information using a deep convolution neural network (DNN). Optionally in a block 234 ICAP uses $\mathcal{P}(sif_{\beta,\eta})$ to determine an image confidentiality figure of merit RCON (ImG) for the MyCompany resource and an image clearance figure of merit UCLR(TxT) for user $U_n$ optionally in accordance with expressions:

US 12,701,118 B2

15                                                                16

$$RCON(ImG) = \sum_{\beta,\eta} P(sif\beta, \eta) \cdot n(sif\beta, \eta) \cdot CON(sif\beta, \eta); \text{ and} \quad (3)$$

$$UCLR(ImG) = \quad (4)$$

$$\sum_{\beta,\eta} \mathcal{P}(sif_{\beta,\eta}) \cdot n(sif_{\beta,\eta}) \cdot CON(sif_{\beta,\eta}) \cdot \mathcal{H}((CLR(sif_{\beta,\eta}) - CON(sif_{\beta,\eta}) + \delta).$$

Optionally, in block 236 ICAP may determine if (RCON (ImG)-UCLR(ImG)) is greater than or equal to a predetermined threshold, TH(ImG), and if so, goes to block 250 to deny request and end. On the other hand if (RCON(ImG)-UCLR(ImG)) is less than the threshold TH(ImG), ICAP may approve the request but operate to locally mask or delete those confidentiality sensitive image features $sif_{\alpha,\eta}$ for which ($CON(sif_{\alpha,\eta})$-$CLR(sif_{\alpha,\eta})$) is greater than a predetermined image masking threshold TH(M ImG).

If as determined in decision block 230, image information is not present in the MyCompany resource, ICAP may proceed to a decision block 238. In decision block 238, if it has been determined that the MyCompany resource comprises audio information, ICAP may proceed to a block 240 and optionally use a natural language processor (NLP) to determine, for the audio information, presence of $saf_{\gamma,\eta}$. In the block ICAP may determine, for $saf_{\gamma,\eta}$ found to be present in the MyCompany resource, an audio confidentiality figure of merit RCON(Audio) for the MyCompany resource and an audio clearance figure of merit UCLR(Audio) for user $U_n$ optionally in accordance with expressions:

$$RCON(Audio) = \sum_{\gamma,\eta} n(saf_{y,\eta}) \cdot CON(saf_{y,\eta}), \text{ and} \quad (5)$$

$$UCLR(Audio) = \quad (6)$$

$$\sum_{\alpha,\delta} n(saf_{y,\eta}) \cdot CON(saf_{y,\eta}) \cdot \mathcal{H}((CLR(saf_{y,\eta}) - CON(saf_{y,\eta}))$$

In a block 242 ICAP determines if (RCON(Audio)-UCLR (Audio)) is greater than or equal to a predetermined threshold, TH(Audio), and if so goes to block 250 to deny request and end. On the other hand if (RCON(Audio)-UCLR(Audio)) is less than the threshold TH(Audio), ICAP may approve the request but operate to locally mask or delete those confidentiality sensitive audio features $saf_{\gamma,\downarrow}$ for which ($CON(saf_{\gamma,\eta})$-$CLR(saf_{\gamma,\eta})$) is greater than a predetermined audio masking threshold TH(MAudio).

In a block 244 ICAP may determine whether RCOR(TxT) is greater than or equal to a predetermined text watermarking threshold TH(TxT-Wmark), RCOR(ImG) is greater than or equal to a predetermined image watermarking threshold TH(ImG-Wmark), or RCOR(Audio) is greater than or equal to a predetermined audio watermarking threshold TH(ImG-Wmark), and if so operates to locally watermark the MyCompany resource with a visible or invisible watermark. Local watermarking in accordance with an embodiment is performed similarly to performing local masking or deleting, without generating changes in data defining a resource as received by a $UE_e$.

It is noted that whereas in flow diagram 200 ICAP determines authorization, masking or deleting, and/or watermarking based on data classes CLS, resource confidentiality levels CON and user clearance levels CLR, practice of an embodiment of the disclosure is not limited to using CLS, CON, and/or CLR as illustrated in the flow diagram. For example, a deep neural network (DNN) may be trained to recognize resource data classes, confidentiality levels, and/ or clearance levels and be used to determine authorization and masking or deleting given a sufficient number of training examples of resource-user pairs. Such a DNN, when provided with a profile U-PRF(n) for a user $U_n$ using a Cyber-Safe browser $SWB_b$ and a scan or feature vector of a resource may in accordance with an embodiment determine whether the user should be granted or denied authorization to engage the resource, and if granted authorization whether or not the resource should undergo feature masking or deleting. A DNN may also be trained to determine what and how a resource should be watermarked. For example, the DNN may determine that a resource being processed in $SWB_b$ should be watermarked with a visible or a hidden, steganographic watermark before the $SWB_b$ transmits the resource.

To facilitate protection of and secure access to MyCompany resources CyberSafe may configure a MyCompany $UE_e$ so that an $SWB_b$ in the $UE_e$ may implement a high resolution observation (HIRO) procedure for observing activity of a user operating the $UE_e$ to interact with MyCompany resources, in accordance with an embodiment of the disclosure.

Figure 4B:
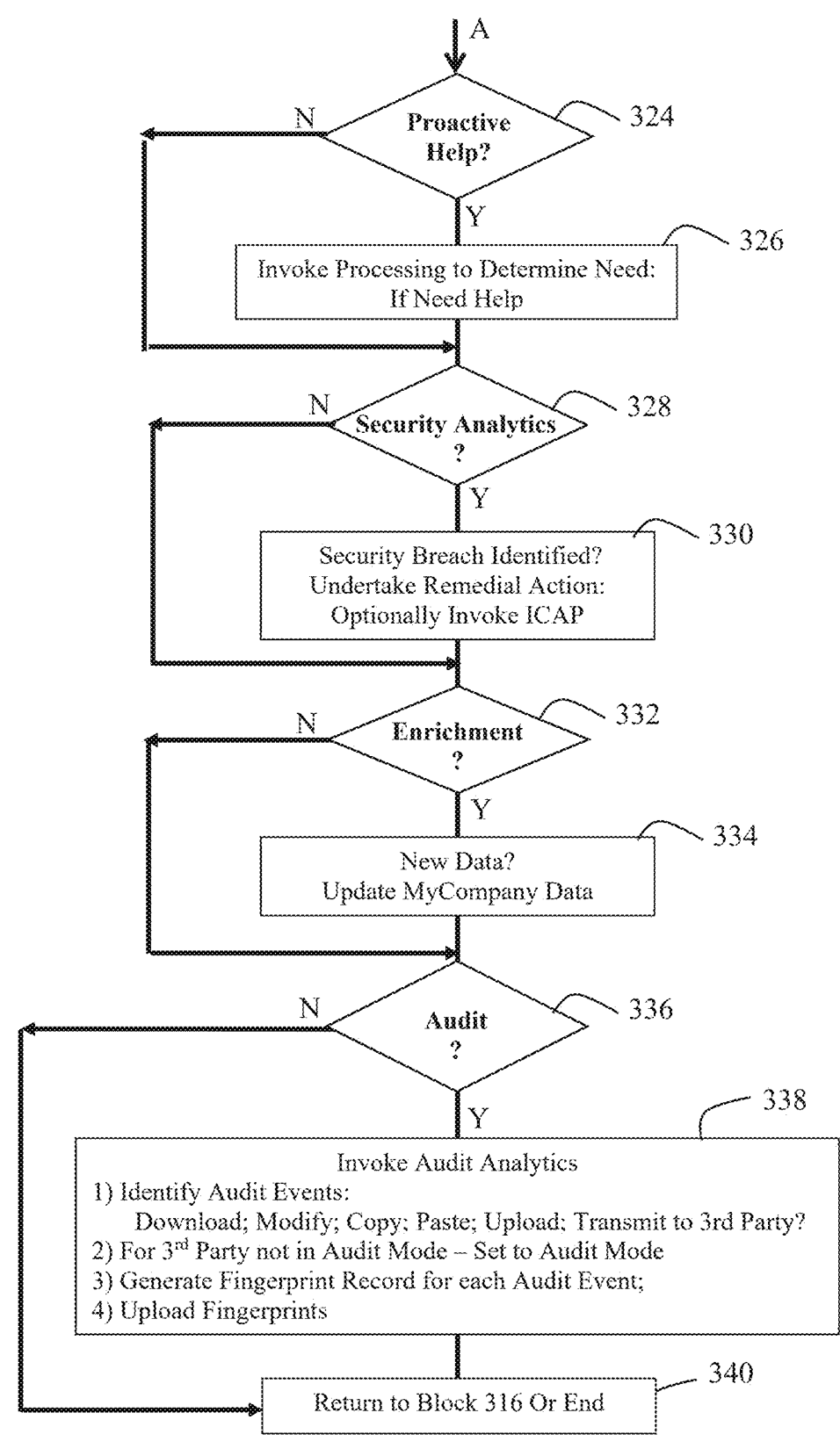
Figure 5:
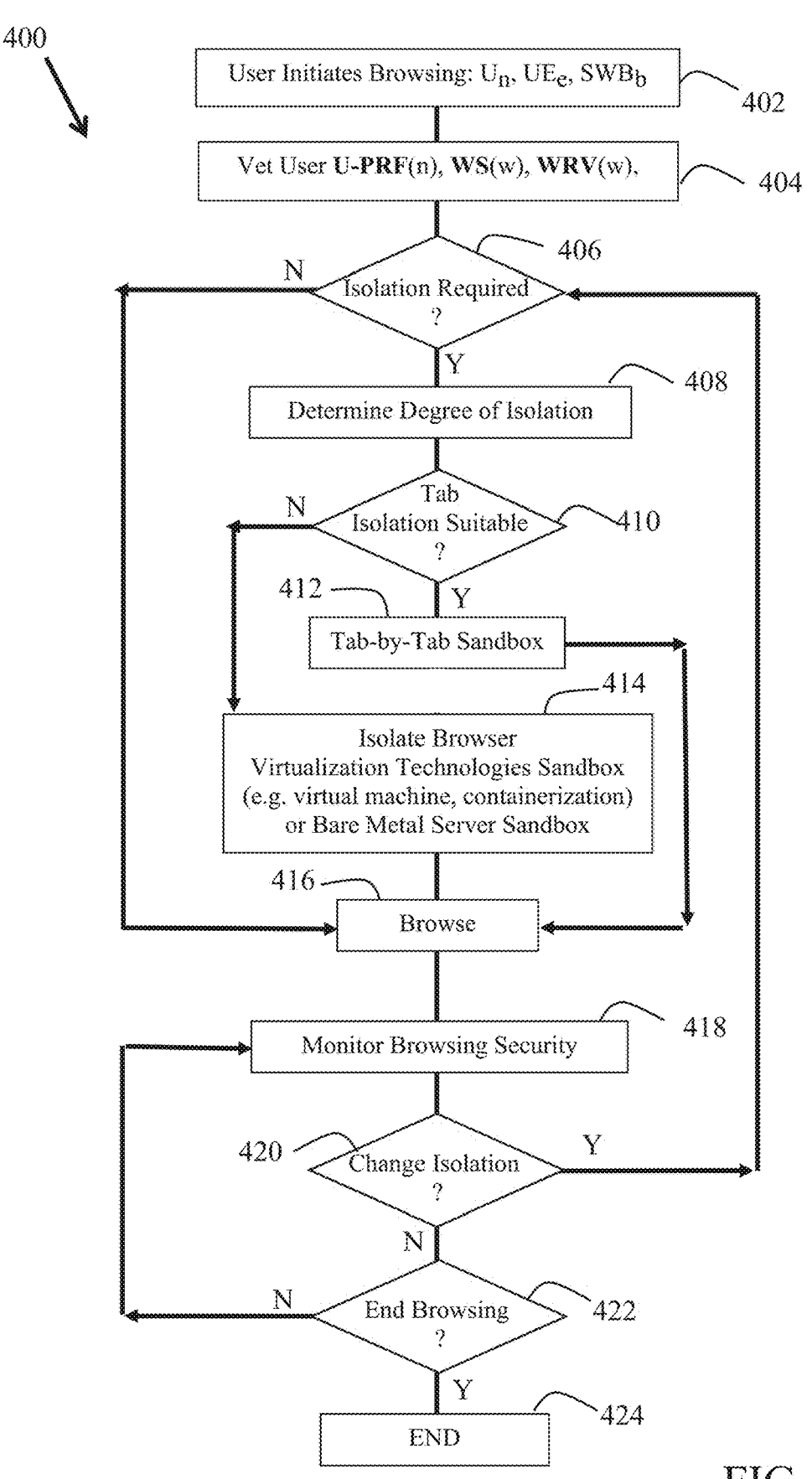
FIG. 5 shows a flow diagram of a procedure by which the SWB shown in FIG. 1 may operate to provide a MyCompany user with browsing isolation, in accordance with an embodiment of the disclosure.

FIGS. 4A-4B illustrate operation of a HIRO procedure 300 for monitoring activity of a user $U_n$, in accordance with an embodiment of the disclosure.

In a block 302 a user $U_n$ who has been authorized by CyberSafe to access and use MyCompany resources subject to and as constrained by MyCompany and/or CyberSafe policies is "tagged" by MyCompany as using $UE_e$ and $SWB_b$ to interact with MyCompany resources, in accordance with an embodiment. Optionally, in a block 304 MyCompany instructs $SWB_b$ to implement HIRO to observe activity of $U_n$ and in a block 306 HIRO initializes a monitoring mode for monitoring user $U_n$ activities while the user is engaging with MyCompany.

A monitoring mode is optionally defined by at least one or any combination of more than one of: user KPIs, $ukpi_{n,k}$, optionally referred to as active $ukpi_{n,k}$, that are selected from the set U-KPI(n)={$ukpi_{n,k}$|1≤k≤K} of user key performance indicators to be monitored by the mode; a temporal configuration characterizing time dependence of the monitoring; a transmission mode, batch or streaming, in accordance with which monitored $ukpi_{n,k}$ data is transmitted by $SWB_b$ to MyCompany; and/or a data analytics profile that specifies at least one desired type of analytics data to be generated by processing the monitored data.

Active user KPIs, $ukpi_{n,s}$ selected for monitoring may comprise any of exemplary $ukpi_{n,k}$ (1≤k≤K) noted above with respect to flow diagram 100. By way of additional examples, exemplary $ukpi_{n,k}$ may be a number and type of websites or resources that the user engages per session and any of various common human-computer action events that a user performs per unit time to communicate with a computer. By way of example, common human-computer action events are, "mouseover", "mouseout", "submit" and/ or "resize", events.

A temporal configuration of a monitoring mode may be characterized as a duty cycle or continuing configuration, and the corresponding monitoring mode as a duty cycle mode or a continuous monitoring mode respectively. A duty cycle mode for an active $ukpi_{n,k}$ is a mode for which the active $ukpi_{n,k}$ is monitored during a monitoring period of interest for each of a plurality of discrete sampling periods separated by hiatuses during which the active $ukpi_{n,k}$ is not monitored. A duty cycle for the mode is equal to a percent of the monitoring period of interest for which the active $ukpi_{n,k}$ is monitored. If the sampling periods have a same duration and a substantially constant sampling frequency at which the sampling periods are initiated, the duty cycle is substantially equal to the sampling frequency multiplied by the duration of the sampling periods divided by the duration of the monitoring period of interest. Sampling periods and sampling frequencies of a duty cycle monitoring mode may be the same for a portion or all active $\text{ukpi}_{n,k}$. Different active $\text{ukpi}_{n,k}$ for at least some of the active $\text{ukpi}_{n,k}$ may have different sampling periods and/or sampling frequencies. A monitoring mode for an active $\text{ukpi}_{n,k}$ is considered to be a continuous monitoring mode if the active $\text{ukpi}_{n,k}$ is monitored substantially continuously for the total duration of the monitoring period of interest and the monitoring mode is not advantageously characterized as a duty cycle.

In an embodiment the analytics data specified by the data analytics profile may comprise at least one or any combination of more than one of proactive help analytics, security analytics, enrichment analytics, and/or audit analytics.

Proactive help analytics involves processing monitoring data to infer a possible user need for help and prescribing substantive help responsive to the need. The inference may be based on, by way of example, identifying a feature of a frenetic search pattern exhibited by the user, an unusual user activity hiatus, a screen shot at a time of the hiatus, an unusual user latency in responding to a resource action, etc. Substantive help may by way of example be determined and configured based on heuristics, a machine learning algorithm, and/or response to a query submitted to a generative AI.

Security analytics comprises processing monitoring data to identify an anomalous event that might indicate a risk for cyber damage and/or infringement of MyCompany policy. An anomalous event may be determined by identifying an outlier value or outlier member of a component of any of the sets used to determine the initial monitoring mode in block 306. An outlier value for a component, such as a user KPI, ukpin,k, or a website risk vulnerability, wrvw.v, may for example be a value for the component that deviates by an amount greater than a standard deviation from an optionally historical, average value for the component. An outlier member may be, for example, a new and possibly high risk website that the user attempts to access for a first time. Response to the anomalous event may comprise invoking an ICAP procedure optionally similar to ICAP 200 illustrated by flow diagram 200 in FIGS. 3A-3C to curtail user permissions and/or access to data in a resource, in accordance with an embodiment of the disclosure. It is noted that whereas ICAP 200 is described as managing data indicated as confidentiality sensitive information features that have been assigned respective confidentiality levels, an ICAP in accordance with an embodiment may be similarly configured to manage and respond to risk sensitive features of resources by assigning risk levels to the features and corresponding risk tolerance clearances to users.

Enrichment analytics involves processing monitoring data to identify analytics data, optionally referred to as new data, that may be used to update or add to information comprised in any of the sets used to determine the initial monitoring mode in block 306. Identifying monitored data as new data may be determined by comparing values provided by or derived from monitored data with corresponding values in sets used to determine the initial monitoring mode in block 306.

Audit analytics involves processing monitoring data to generate audit data records that identify and specify details of trajectories that a MyCompany digital resource traverses. A trajectory may be any traversal of a resource between communication nodes comprised in a MyCompany and/or a CyberSafe local or wide area network communications network (LAN or WAN respectively) and/or between a MyCompany and/or a CyberSafe node and a node external to MyCompany or CyberSafe, and changes that the resource may undergo at the nodes. An audit data record is optionally generated for each of a plurality of audit trigger events that may include by way of example: downloading a MyCompany resource, amending the resource, copying material from the resource, pasting the material to a clipboard, and/or transmitting the resource, the amended resource, or a portion of the resource to a printer. In an embodiment, an audit data record for an event occurring at a user $\text{UE}_e$ comprises a value for each of a plurality of keys of key-value pairs, where the keys comprise at least one or any combination of more than one of: an event time stamp; an extended ID associated with a MyCompany user using the $\text{UE}_e$, hash of metadata identifying and/or characterizing the resource, a hash of the contents of the resource or at least one portion of the resource, and a source address of a source from which the $\text{UE}_e$ received the resource, and/or a destination address of a destination to which the resource is transmitted from the $\text{UE}_e$.

In an embodiment HIRO may initialize the monitoring mode optionally responsive to any one or any combination of more than one of: a component of the user $U_n$ profile U-PRF(n); user equipment $\text{UE}_e$; a component of the risk vector HVR(e) for the $\text{UE}_e$; a component of the set HCC(e) of compromised components of $\text{UE}_e$ ambient software; a component of the set CPA (b) of $\text{SWB}_b$ cyber cladding software attributes; and/or a component of the user clearance profile CLR(n,e,b). The initialized monitoring mode may also be determined responsive to a website $\text{ws}_w$ from a set of websites $\text{WS}=\{\text{ws}_w|(1 \leq w \leq W)\}$ monitored by MyCompany and visited by MyCompany users, and/or a value of a risk component of a set of website risk vulnerabilities WRV(w)= $\{\text{wrv}_{w,v}|1 \leq v \leq V)\}$, where $\text{wrv}_{w,v}$ quantifies a cyber risk vulnerability for website $\text{ws}_w$ determined by MyCompany or CyberSafe. Any of various artificial intelligences (AI) such as a deep neural network (DNN) or machine learning (ML) algorithm may be used to assign risk levels to vulnerabilities. Optionally, a heuristic classification is used to determine risk vulnerabilities. In an embodiment HIRO may initialize the monitoring mode responsive to a data analytics profile.

By way of a simplified example, an initialized monitoring mode for a MyCompany user having a user profile U-PRF (n) considered to indicate a relatively high risk for cyber damage may be configured as a duty cycle monitoring mode having a relatively high duty cycle or as a continuous monitoring mode. User profile U-PRF(n) may by way of example be considered to indicate a high risk if one or more user risk components $\text{ucrp}_{n,r}$ of U-CRP(n) is considered to indicate a high risk of cyber damage. On the other hand for a MyCompany user having relatively high clearance level components $\text{CLR}_n(\alpha,\beta,\gamma,\eta)$ in the user clearance profile set, CLR(n,e,b), the initialized mode may be a duty cycle mode having a relatively small duty cycle.

In a decision block 308, if HIRO initializes the monitoring mode to a duty cycle mode HIRO may proceed to a block 310 and select a set of active $\text{ukpi}_{n,k}$, determine for each of the selected $\text{ukpi}_{n,k}$ a duty cycle, and determine if data transmission is batch or stream transmission.

On the other hand if HIRO does not initialize the monitoring mode to a duty cycle mode but to a continuous monitoring mode HIRO may proceed to a block 312. In block 312 HIRO selects active user KPIs ukpi$_{n,k}$ for continuous monitoring and determines if data transmission is batch or stream transmission.

In a block 316 HIRO begins monitoring user activity, recording, and transmitting data to MyCompany in accordance with the initialized monitoring mode.

Optionally in a block 318 HIRO determines a substantially real-time value for a metric of user activity, optionally referred to as an activity temperature, that provides an indication of intensity of user interaction with MyCompany resources while using UE$_e$. By way of example, the activity temperature may be an, optionally weighted, average of real-time monitored values for at least a portion of active user, ukpi$_{n,k}$, optionally referred to as heat ukpi$_{n,k}$. Optionally, HIRO determines the activity temperature as a function of a number of events per unit time determined from monitored data acquired for the heat ukpi$_{n,k}$. In an embodiment the heat events comprise human-computer action events such as keyboard, mouse, and screen touch events that are commonly used to interact with a computer.

Optionally in a block 320 HIRO determines a difference between the real-time activity temperature and a baseline activity temperature determined from normative values for heat ukpi$_{n,k}$ provided by user profile U-PRF(n) used in block 306 to initialize the monitoring mode for observing activity of user U$_n$. If the difference is greater than a predetermined threshold difference TH(temp) in a block 322 HIRO may adjust the monitoring mode, for example by changing a duty cycle of an active and a heat ukpi$_{n,k}$, or by changing the monitoring mode from a duty cycle mode to a continuous mode or a continuous mode to a duty cycle mode.

For example if the real-time activity temperature is relatively low, indicating a relatively low user activity, it may be advantageous to increase sampling times and duty cycles of active ukpi$_{n,k}$ in order to acquire sufficient timely monitoring data for generating reliable analytics. Or if the activity temperature is relatively high and/or improved temporal resolution is desired it may be advantageous to decrease sampling times but increase sampling frequencies, or to change a current monitoring mode from a duty cycle monitoring mode to a continuous monitoring mode. By way of another example, if the user activity temperature is relatively low and the user is interacting with a known webpage or other resource that does not involve intense user activity it may be reasonable to reduce duty cycles when a current monitoring mode is a duty cycle mode or switch from a current continuous mode to a duty cycle mode. Adjustments to a monitoring mode may also be made by changing which user ukpi$_{n,k}$ are active or a number of active ukpi$_{n,k}$. In an embodiment HIRO is configured to adjust monitoring modes dynamically in real-time.

In a decision block 324, if the monitoring mode data analytics profile specifies that the monitoring mode engage in proactive help, HIRO may proceed to a block 326 and invoke help analytics to identify and respond to a user need as described above. Otherwise HIRO may proceed to a decision block 328. In decision block 328 if the analytics profile specifies that the monitoring mode engage in security analytics, HIRO may proceed to a block 330 and invoke security analytics to identify security breaches and optionally undertake remedial action to counter identified breaches as described above. Otherwise HIRO may proceed to a decision block 332. In decision block 332 if the analytics profile specifies that the monitoring mode engage in data enrichment, HIRO may proceed to a block 334 and invoke enrichment analytics to identify new data and optionally update relevant MyCompany data, such as data in the user profile U-PRF(n) and/or data in website risk vulnerabilities WRV(w). Otherwise HIRO may proceed to a decision block 336. In decision block 336 if the analytics profile does not specify engaging in audit analytics HIRO may proceed to a block 340 and either end monitoring activity of user U$_n$ or return to block 316 and continue monitoring. On the other hand, if in block 336 the analytics profile does specify engaging in audit analytics HIRO may proceed to a block 338, invoke audit analytics and generate audit data records for audit trigger events that enable MyCompany to audit a history of a MyCompany resource as it may move through and morph in the MyCompany network. HIRO may then proceed to block 340 and either cease monitoring activity or return to block 316 and continue monitoring.

A hypothetical history of a given MyCompany resource, optionally a research report "X", traversing MyCompany network illustrates operation of HIRO audit analytics, in accordance with an embodiment of the disclosure.

Let trg$_\mu$ represent an audit trigger event of a set of audit trigger events TRG(b)={trg$_\mu$|(1≤μ≤U)} such as the trigger events referred to above that might occur in a SWB$_b$ of a UE$_e$ being used by a user U$_n$. Let AUR(b) represent an audit data record comprising components {aurα|(1≤α≤A)} generated and forwarded to MyCompany by SWB$_b$ in response to an audit trigger event associated with a MyCompany resource that occurs in SWB$_b$. In accordance with an embodiment of the disclosure, the components comprise values for key-value pairs discussed above and in addition advantageously an ID for the audit trigger event that caused SWB$_b$ to generate and forward the audit data record to MyCompany.

Assume that MyCompany research report "X", is downloaded to a browser SWB$_1$ in a UE$_1$ at a time ToD$_1$ by a MyCompany first user U$_1$. Downloading may be an audit trigger event, "trg$_1$" that causes SWB$_1$ to generate and upload to MyCompany a "first" audit data record, AUR(1)$_1$, to MyCompany. AUR(1)$_1$ may show that at ToD$_1$ user U$_1$ downloaded X, having a hash H1-M of metadata identifying X, and a hash H1-C of a portion of the contents of X, from an IP address A$_1$. A second audit data record, AUR(1)$_2$, generated and uploaded by SWB$_1$ responsive to a trigger event trg$_2$ of user U$_1$ making a change to X, shows that at a time ToD$_2$, U$_1$ changed the metadata of X. All components of AUR(1)$_2$ are the same as the corresponding components of AUR(1)$_1$ except for a metadata hash H2-M replacing metadata hash H1-M. A third audit data record AUR(1)$_3$ generated and uploaded by SWB$_1$ shows that at a time ToD$_3$, U$_1$ transmitted a document having a contents hash identical to that of H1-C and metadata hash H2-M to an IP address A$_2$ of a second MyCompany user U$_2$ operating a browser SWB$_2$. A fourth audit data record, AUR(2)$_4$, generated and uploaded by SWB$_2$ shows that at a time ToD$_4$ shortly after time ToD$_3$, user U$_2$ received a document bearing metadata hash H2-M from user UI. A fifth audit data record, AUR(2)$_5$, generated and uploaded by SWB$_2$ shows that U$_2$ emailed to a non-MyCompany employee, a document having a third metadata hash H3-M but the same contents hash H1-C as that in audit data record AUR(1)$_1$ for document X. By processing uploaded audit data records, MyCompany is able to determine that the contents of audit data records AUR(1)$_1$-AUR(2)$_5$ are associated with document X and that users U1 and U2 are cooperating in leaking MyCompany confidential material to an outside entity.

In an embodiment an SWB$_b$ in a MyCompany UE$_e$ may be configured to implement methods for providing users with dynamic tailoring isolation (DYTI) to protect MyCompany resources against damage. DYTI refers to protecting user browsing activity dynamically in real time by configuring isolation of the browsing activity as needed in response to relevant historical and real-time user and website behaviour. In an embodiment DYTI may operate to provide dynamically tailored browser isolation in accordance with a procedure similar to that illustrated by flow diagram 400.

In a block 402 a user $U_n$, using a $SWB_b$ comprised in a $UE_e$, initiates a web browsing session. In response, optionally in a block 404 $SWB_b$ may invoke DYTI and operate to vet data comprised in or associated with at least one or any combination of more than one of user profile U-PRF(n), $UE_e$ and/or $SWB_b$, and/or set WRV(w) of website risk vulnerabilities that may affect cyber damage risk related to browsing. In response to the vetting, optionally in a block 406, DYTI decides whether or not isolation is advantageous. For example, if the user profile U-PRF(n) indicates that user $U_n$ is prone to careless response to phishing, has relatively low clearance levels CLR, that the $UE_e$ has outdated patching, and/or that websites to which user $U_n$ navigates are generally characterized by high risk vulnerabilities, DYTI may determine that isolation is advantageous. On the other hand, if DYTI determines for user $U_n$, $UE_e$, and/or $SWB_b$ that browsing risk is relatively low, DYTI may determine that isolation may be unnecessary. If isolation is determined unnecessary, DYTI may advance to a block 416 and allow browsing without isolation.

On the other hand, if isolation is determined to be necessary, DYTI may determine, optionally in a block 408, what type and degree of isolation an isolation configuration advantageously provides for user $U_n$ browsing. In an embodiment isolation configuration types include tab-by-tab isolation and a browser isolation. Tab-by-tab isolation configuration provides isolation for resources that are accessed during a session associated with a given tab and may, optionally, provide different isolation features for different webpages accessed during and via the tab session. Browser isolation isolates an entire browser and is generally considered to provide more comprehensive isolation than tab-by-tab isolation. It is noted that browser isolation for a given browser may "nest" tab-by-tab isolation and isolate tabs opened in the browser from each other and from the given browser A degree of isolation for a given isolation configuration type may be considered to increase as a number of isolation features comprised in the configuration type increases and as severity of limitations that the isolation features respectively impose on browsing increases. By way of example, a short list of exemplary isolation features in an order in which they may be considered to be "severe" may be: server signature disablement; error message disablement; clickjacking prevention; and remote file inclusion blocking.

Responsive to the determination in block 408, optionally in a block 410 DYTI determines whether or not tab-by-tab isolation is suitable to provide the desired degree of isolation. If tab-by-tab isolation is considered suitable, DYTI may advance to a block 412, specify isolation features for the tab-by-tab isolation that provide user $U_n$ browsing with the desired degree of isolation, and proceed to block 416 and allow user $U_n$ to browse. On the other hand, if in decision block 410 DYTI determines that tab-by-tab isolation is not suitable, DYTI may optionally proceed to a block 414 to provide, optionally operating system based (OS-based) isolation, for browser $SWB_b$ using a virtualization technology sandbox, such as a virtual machine or a container, or via a bare metal server sandbox. From block 414 DYTI may proceed to block 416 and allow user $U_n$ browsing.

In an embodiment, following allowance of $U_n$ browsing in block 416, DYTI in a block 418 may engage in in real-time monitoring of user browsing to determine optionally in a decision block 420 whether a feature of the browsing, such as by way of example, an anomalous event or user $U_n$ access to an unknown or particularly malicious website, warrants a change in configuration of isolation. If a change in isolation is indicated, DYTI optionally returns to decision block 406 to determine a type and degree of isolation required. Optionally DYTI is configured to make the change and makes the change. If change in isolation is not indicated, DYTI may proceed to a decision block 422 to decide if user $U_n$ has closed the browsing session, and if not, returns to block 418 to continue monitoring user browsing. If the user has closed the browsing session DYTI proceeds to a block 424, closes any open sandboxes, and ends DYTI activity. In accordance with an embodiment DYTI is configured so that establishing a particular isolation configuration and/or making changes to an isolation configuration during a browsing session are substantially transparent to a user, such as user $U_n$.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method comprising:
monitoring activity across a plurality of users at a plurality of browser instances running on respective ones of a plurality of nodes in a network corresponding to a company, wherein monitoring activity of the plurality of users comprises,
    detecting events at the plurality of browser instances that trigger auditing of activity of the plurality of users; and
    generating records corresponding to the events, wherein each record indicates a time stamp of the corresponding one of the events, an identifier of a resource corresponding to the event, and a hash of at least a portion of content of the resource corresponding to the event; and
determining a traversal of a resource through the plurality of nodes corresponding to a potential security breach based on the records, wherein identifying the traversal of the resource comprises identifying a sequence of the records based on the time of day indicated in the records and based on each consecutive pair of records in the sequence indicating at least one of a same hash of at least a portion of content and a same identifier of the resource of the determined traversal.

2. The method of claim 1, wherein identifying the sequence of the records corresponding to the traversal of the resource comprises identifying the sequence of the records arranged sequentially according to the time stamps indicated in the records.

3. The method of claim 2, wherein identifying the sequence of the records corresponding to the traversal of the resource comprises:

identifying a first record of the records corresponding to a first node of the plurality of nodes at a first time stamp, wherein the first record indicates uploading the resource from the first node to a second node of the plurality of nodes; and identifying a second record of the records corresponding to the second node and the resource at a second time stamp subsequent to the first time stamp.

4. The method of claim 2, wherein identifying the sequence of the records corresponding to the traversal of the resource comprises:

identifying a first record of the records that indicates a modification of the resource at a second node of the plurality of nodes, wherein the first record comprises at least one of a first identifier and a first hash of at least a portion of content corresponding to the resource prior to the modification and at least one of a second identifier and a second hash of at least a portion of content corresponding to the resource subsequent to the modification; and identifying a second record of the second node or a third node subsequent to the first record that indicates at least one of the second identifier and the second hash.

5. The method of claim 1, wherein the events at the plurality of browser instances comprise at least one of downloading resources, modifying resources, copying resources, pasting resources to a clipboard, and uploading resources.

6. The method of claim 1, wherein determining the traversal of the resource comprises identifying an initial record in the sequence of the records that indicates an initial download of the resource.

7. The method of claim 1, wherein determining the traversal of the resource comprises identifying a final record in the sequence of the records that indicates an upload of the resource to an entity external to the company.

8. The method of claim 1, further comprising:

identifying at least a subset of the plurality of users being indicated in the sequence of the records; and associating the subset of users with the potential security breach.

9. A non-transitory machine-readable medium having program code stored thereon, the program code comprising instructions to:

monitor activity across a plurality of users at a plurality of browser instances running on respective ones of a plurality of nodes in a network corresponding to a company, wherein the instructions to monitor activity of the plurality of users comprise instructions to, detect events at the plurality of browser instances that trigger auditing of activity of the plurality of users; and generate records corresponding to the events, wherein each record indicates a time stamp of the corresponding one of the events, an identifier of a resource corresponding to the event, and a hash of at least a portion of content of the resource corresponding to the event; and determine a traversal of a resource through the plurality of nodes corresponding to a potential security breach based on the records, wherein the instructions to identify the traversal of the resource comprise instructions to identify a sequence of the records based on the time of day indicated in the records and based on each consecutive pair of records in the sequence indicating at least one of a same hash of at least a portion of content and a same identifier of the resource of the determined traversal.

10. The non-transitory machine-readable medium of claim 9, wherein the instructions to identify the sequence of the records corresponding to the traversal of the resource comprise instructions to identify the sequence of the records arranged sequentially according to the time stamps indicated in the records.

11. The non-transitory machine-readable medium of claim 10, wherein the instructions to identify the sequence of the records corresponding to the traversal of the resource comprise instructions to:

identify a first record of the records corresponding to a first node of the plurality of nodes at a first time stamp, wherein the first record indicates uploading the resource from the first node to a second node of the plurality of nodes; and identify a second record of the records corresponding to the second node and the resource at a second time stamp subsequent to the first time stamp.

12. The non-transitory machine-readable medium of claim 10, wherein the instructions to identify the sequence of the records corresponding to the traversal of the resource comprise instructions to:

identify a first record of the records that indicates a modification of the resource at a second node of the plurality of nodes, wherein the first record comprises at least one of a first identifier and a first hash of at least a portion of content corresponding to the resource prior to the modification and at least one of a second identifier and a second hash of at least a portion of content corresponding to the resource subsequent to the modification; and identify a second record of the second node or a third node subsequent to the first record that indicates at least one of the second identifier and the second hash.

13. The non-transitory machine-readable medium of claim 9, wherein the events at the plurality of browser instances comprise at least one of downloading resources, modifying resources, copying resources, pasting resources to a clipboard, and uploading resources.

14. The non-transitory machine-readable medium of claim 9, wherein the instructions to determine the traversal of the resource comprise instructions to identify an initial record in the sequence of the records that indicates an initial download of the resource.

15. The non-transitory machine-readable medium of claim 9, wherein the instructions to determine the traversal of the resource comprise instructions to identify a final record in the sequence of the records that indicates an upload of the resource to an entity external to the company.

16. The non-transitory machine-readable medium of claim 9, wherein the program code further comprises instructions to:

identify at least a subset of the plurality users indicated in the sequence of the records; and associate the subset of users with the potential security breach.

17. A apparatus comprising:

a processor; and a machine-readable medium having instructions stored thereon that are executable by the processor to cause the apparatus to, monitor activity of a plurality of users at a plurality of browser instances running on respective ones of a plurality of nodes in a network corresponding to a company, wherein the instructions to monitor activity of the plurality of users comprise instructions executable by the processor to cause the apparatus to, detect events at the plurality of browser instances that trigger auditing of activity of the plurality of users; and generate records corresponding to the events, wherein each record indicates a time stamp of the corresponding one of the events, an identifier of a resource corresponding to the event, and a hash of at least a portion of content of the resource corresponding to the event; and determine a traversal of a resource through the plurality of nodes corresponding to a potential security breach based on the records, wherein the instructions to identify the traversal of the resource comprise instructions executable by the processor to cause the apparatus to identify a sequence of the records based on the time of day indicated in the records and based on each consecutive pair of records in the sequence indicating at least one of a same hash of at least a portion of content and a same identifier of the resource of the determined traversal.

18. The apparatus of claim 17, wherein the instructions to identify the sequence of the records corresponding to the traversal of the resource comprise instructions executable by the processor to cause the apparatus to identify the sequence of the records arranged sequentially according to the time stamps indicated in the records.

19. The apparatus of claim 18, wherein the instructions to identify the sequence of the records corresponding to the traversal of the resource comprise instructions executable by the processor to cause the apparatus to:

identify a first record of the records corresponding to a first node of the plurality of nodes at a first time stamp, wherein the first record indicates uploading the resource from the first node to a second node of the plurality of nodes; and identify a second record of the records corresponding to the second node and the resource at a second time stamp subsequent to the first time stamp.

20. The apparatus of claim 18, wherein the instructions to identify the sequence of the records corresponding to the traversal of the resource comprise instructions executable by the processor to cause the apparatus to:

identify a first record of the records that indicates a modification of the resource at a second node of the plurality of nodes, wherein the first record comprises at least one of a first identifier and a first hash of at least a portion of content corresponding to the resource prior to the modification and at least one of a second identifier and a second hash of at least a portion of content corresponding to the resource subsequent to the modification; and identify a second record of the second node or a third node subsequent to the first record that indicates at least one of the second identifier and the second hash.

21. The apparatus of claim 17, wherein the events at the plurality of browser instances comprise at least one of downloading resources, modifying resources, copying resources, pasting resources to a clipboard, and uploading resources.

22. The apparatus of claim 17, wherein the instructions to determine the traversal of the resource comprise instructions executable by the processor to cause the apparatus to identify an initial record in the sequence of the records that indicates an initial download of the resource.

23. The apparatus of claim 17, wherein the instructions to determine the traversal of the resource comprise instructions executable by the processor to cause the apparatus to identify a final record in the sequence of the records that indicates an upload of the resource to an entity external to the company.

* * * * *